United States Patent
Hsu et al.

(10) Patent No.: US 10,059,839 B2
(45) Date of Patent: Aug. 28, 2018

(54) STABILIZED POLYESTER BASED COMPOSITIONS

(71) Applicants: UNIVERSITY OF MASSACHUSETTS, Boston, MA (US); SAINT-GOBAIN PERFORMANCE PLASTICS CORPORATION, Solon, OH (US)

(72) Inventors: Shaw Ling Hsu, Sunderland, MA (US); Sahas Rathi, Amherst, MA (US); Edward Bryan Coughlin, Amherst, MA (US); Thomas J. McCarthy, Amherst, MA (US); Charles S. Golub, Westford, MA (US); Gerald H. Ling, Wayland, MA (US); Michael J. Tzivanis, Chicopee, MA (US)

(73) Assignees: UNIVERSITY OF MASSACHUSETTS, Boston, MA (US); SAINT-GOBAIN PERFORMANCE PLASTICS CORPORATION, Solon, OH (US)

(*) Notice: Subject to any disclaimer, the term of this patent is extended or adjusted under 35 U.S.C. 154(b) by 22 days.

(21) Appl. No.: 14/140,113

(22) Filed: Dec. 24, 2013

(65) Prior Publication Data
US 2014/0186563 A1    Jul. 3, 2014

Related U.S. Application Data

(60) Provisional application No. 61/746,192, filed on Dec. 27, 2012.

(51) Int. Cl.
C08L 67/04    (2006.01)
C08K 5/00    (2006.01)
C08L 71/02    (2006.01)

(52) U.S. Cl.
CPC ............ *C08L 67/04* (2013.01); *C08K 5/0016* (2013.01); *C08L 71/02* (2013.01); *Y10T 428/139* (2015.01);
(Continued)

(58) Field of Classification Search
CPC ............... C08L 67/04; Y10T 442/3146; Y10T 442/637; Y10T 428/139
(Continued)

(56) References Cited

U.S. PATENT DOCUMENTS 4,499,219 A    2/1985  Buxbaum et al.
4,914,145 A    4/1990  Tohdoh et al.
(Continued)

FOREIGN PATENT DOCUMENTS

CN    101384641 A    3/2009
JP    2008-169239 A    7/2008
(Continued)

OTHER PUBLICATIONS

Helmut Munstedt, et al., "Deformation and flow of polymeric materials," Springer-Verlag, Berlin Heidelberg (2014).*
(Continued)

*Primary Examiner* — James C Yager
*Assistant Examiner* — Kevin C Ortman, Jr.
(74) *Attorney, Agent, or Firm* — Abel Law Group, LLP; Chi Suk Kim

(57) ABSTRACT

A polyester or polyester copolymer based composition, such as a polylactic acid based composition, is provided herein. The polyester or polyester copolymer based composition may include a plasticizer, such as an ether based, an ester based, and/or an ether-ester based plasticizer.

19 Claims, 30 Drawing Sheets

(52) U.S. Cl.
CPC ...... *Y10T 442/3146* (2015.04); *Y10T 442/637* (2015.04)

(58) Field of Classification Search
USPC ............... 428/36.9, 35.7; 525/190; 521/134; 442/119, 361
See application file for complete search history.

(56) References Cited

U.S. PATENT DOCUMENTS

| | | | |
|---|---|---|---|
| 6,235,825 | B1 | 5/2001 | Yoshida et al. |
| 6,984,694 | B2 | 1/2006 | Blasius, Jr. et al. |
| 7,576,152 | B2 | 8/2009 | Takenaka et al. |
| 8,003,731 | B2 | 8/2011 | Seeliger et al. |
| 8,022,139 | B2 | 9/2011 | Kurihara et al. |
| 8,119,706 | B2 | 2/2012 | Takenaka et al. |
| 8,268,738 | B2 | 9/2012 | McEneany et al. |
| 2006/0252889 | A1 | 11/2006 | Natarajan et al. |
| 2009/0171065 | A1 | 7/2009 | Nakamura et al. |
| 2009/0239433 | A1 | 9/2009 | Kurihara et al. |
| 2010/0093888 | A1* | 4/2010 | Endo et al. .................. 523/124 |
| 2010/0324220 | A1* | 12/2010 | Toyohara ............. C08L 67/02 525/183 |
| 2012/0048380 | A1 | 3/2012 | Thomas et al. |
| 2012/0164905 | A1* | 6/2012 | Topolkaraev et al. ......... 442/364 |
| 2012/0211927 | A1* | 8/2012 | Li et al. ....................... 264/523 |
| 2012/0270979 | A1 | 10/2012 | Hsu et al. |
| 2013/0331493 | A1* | 12/2013 | Yamamura ............ C08J 5/18 524/145 |

FOREIGN PATENT DOCUMENTS

| | | | | |
|---|---|---|---|---|
| JP | 2010-163203 | A | | 7/2010 |
| JP | WO 2012114810 | A1 * | 8/2012 | ............ C08J 5/18 |
| TW | 200736332 | | | 10/2007 |
| WO | 2007-094352 | A1 | | 8/2007 |
| WO | 2012102952 | A1 | | 8/2012 |

OTHER PUBLICATIONS

Scheirs, et al., "Additives for the Modification of Poly(Ethylene Terephthalate) to produce Engineering-Grade Polymers," J. Scheirs, Modern Polyesters: Chemistry and Technology of Polyesters and Copolyesters, p. 495-540, 2003.*

The International Search Report and the Written Opinion received from the International Searching Authority (ISA/KR) for International Application No. PCT/US2013/077665 dated Apr. 15, 2014, 15 pages.

European Supplementary Search Report received from the European Patent Office for European Application No. 13867997.2 dated Jul. 28, 2016, 1 page.

* cited by examiner

Mechanical properties of the films subjected to varying thermal profiles
(Crosshead speed: 10 mm/min)

STABILIZED POLYESTER BASED COMPOSITIONS

FIELD OF THE DISCLOSURE

The present disclosure generally relates to polyester and polyester copolymer based compositions, such as polylactic acid based compositions. In particular, the present disclosure relates to stabilized polylactic acid compositions, which includes functionalized plasticizers incorporated therein.

BACKGROUND

Polyester and polyester copolymer compositions include, inter alia, polylactic acid (PLA). Polylactic acid may be considered a, renewably sourced, a biodegradable and/or a biocompatible polymer, and belongs to a group of polymers known as aliphatic polyesters. In general terms, so long as the basic monomers (lactic acid) of polylactic acid are produced from renewable resources (e.g., sugar or other carbohydrates), polylactic acid can generally be classified as an environmentally friendly material.

The synthesis of polylactic acid is a multistep process, generally beginning with the production of lactic acid (monomer) and ending with various polymerization steps. To offer somewhat of an oversimplified summary, polylactic acid may be synthesized via condensation polymerization of lactic acid, which generally yields a low molecular weight polylactic acid. Alternatively, polylactic acid may be synthesized through a series of dehydrative condensation, depolymerization and ring opening polymerization reactions, which generally yields a high molecular weight polylactic acid. Nowadays, polylactic acid can be found available in a wide variety of industrial commercial grades.

The stereochemical structure of polylactic acid can be essentially modified by polymerizing a controlled mixture of L and D isomers to yield high molecular weight amorphous and/or semi-crystalline polymers.

Although polylactic acid has been afforded some attention in recent years as a relatively inexpensive polymer to make, as well as for certain properties which make polylactic acid suitable for wide variety of applications, the commercialization of polylactic acid is not without its own unique set of challenges and difficulties More specifically, and in some ways independent of the processing methodology (e.g., injection molding, compression molding, extrusion molding, blow molding, foam molding, etc.), in order for certain polyester and polyester copolymer based compounds, such as polylactic acid, to be processed into a final product, it is useful to enhance or improve the thermal stability and/or hydrolytic stability prior to or post processing to prevent or minimize degradation, and maintain molecular weight and other properties.

In particular, polylactic acid is generally processed at temperatures ranging from about 175° C. to about 190° C., yet is also at risk of thermal degradation at temperatures greater than about 195° C. to about 200° C. As a result, this narrow processing window creates a need for approaches to improve the processability of polyester and polyester copolymer based compositions, such as polylactic acid.

Accordingly, approaches such as reducing the glass transition temperature of polylactic acid, increasing the molecular weight, viscosity and/or changes in acid value and/or hydroxyl value would be useful. The present disclosure addresses these and other needs by providing polyester or polyester copolymer based compositions, such as polylactic acid based compositions, having improved stability as described herein.

SUMMARY

A composition is provided herein, the composition including 15 to 90 wt. % a polyester or a polyester copolymer, based on a total weight of the composition; and 0.1 to 55 wt. % of an ether based, an ether-ester based, or an ester based functionalized plasticizer is provided herein, based on a total weight of the composition. In embodiments, the plasticizer includes one or more compounds selected from the group consisting of an epoxy based compound, a polycarbodiimide based compound, a phosphite containing compound, a hindered phenol, a bi-cyclic-imino ether, a bi-cyclic-imino ester, a hindered amine, 2,2'-bis(2-oxazoline) based molecules, isocyanates, di-isocyanates, and a combination thereof.

Additionally, a composition is provided herein, the composition including a polyester or a polyester copolymer; and a plasticizer. In embodiments, the plasticizer may include one or more compounds selected from the group consisting of an epoxy based compound, a polycarbodiimide based compound, a phosphite containing compound, a hindered phenol, a bi-cyclic-imino ether, a bi-cyclic-imino ester, a hindered amine, 2,2'-bis(2-oxazoline) based molecules, isocyanates, di-isocyanates, and a combination thereof. The composition may also include a glass transition temperature of less than about 60° C.

Additionally, a composition is provided herein, the composition including a polyester or a polyester copolymer; and a plasticizer. In embodiments, the plasticizer may include one or more compounds selected from the group consisting of an epoxy based compound, a polycarbodiimide based compound, a phosphite containing compound, a hindered phenol, a bi-cyclic-imino ether, a bi-cyclic-imino ester, a hindered amine, 2,2'-bis(2-oxazoline) based molecules, isocyanates, di-isocyanates, and a combination thereof. The composition may also include an acid value of less than about 25 mgKOH/g.

Additionally, a composition is provided herein, the composition including a polyester or polyester copolymer; and a plasticizer. In embodiments, the plasticizer may include one or more compounds selected from the group consisting of an epoxy based compound, a polycarbodiimide based compound, a phosphite containing compound, a hindered phenol, a bi-cyclic-imino ether, a bi-cyclic-imino ester, a hindered amine, 2,2'-bis(2-oxazoline) based molecules, isocyanates, di-isocyanates, and a combination thereof. The composition may also include an increase in viscosity, the viscosity being measured at a temperature above a melt state of the composition. Moreover, the increase in viscosity can be measured in comparison to a comparative composition, where the comparative composition includes an identical grade of polyester or polyester component and a plasticizer component, without the functionality added to the plasticizer component.

BRIEF DESCRIPTION OF THE DRAWINGS

Embodiments are illustrated by way of example and are not limited in the accompanying figures.

Figure 1:
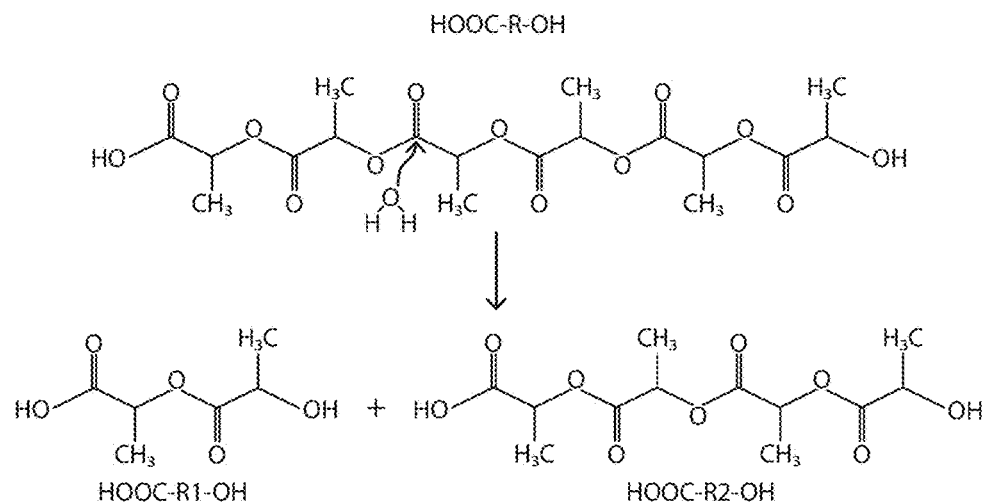
FIG. 1 includes a schematic illustration of the degradation pathway of a polyester such as PLA.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B is true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

All ranges disclosed herein include, unless specifically and expressly indicated to the contrary, all endpoints and intermediate values.

Various embodiments of the present disclosure will now be described, by way of example only.

Polyester and polyester copolymer based compositions, such as polylactic acid based compositions, are generally processed at temperatures ranging from about 175° C. to about 190° C. However, polylactic acid based compositions are also at risk of thermal degradation at temperatures greater than about 195° C. to about 200° C. (and even at temperatures falling slightly outside of this range on a case specific basis). Nevertheless as a result, this narrow processing window creates a significant need for approaches to improve the processability of polyester and polyester copolymer based compositions, such as polylactic acid, when processed, for example, into intermediate and/or final products.

With respect to polymer degradation and namely thermal degradation of polylactic acid, any one of hydrolytic degradation, lactic reformation, oxidative main chain scission and/or inter or intra-molecular transesterification reactions may occur at temperatures greater than about 195° C. to about 200° C., which in turn may significantly inhibit and otherwise adversely affect the overall processability of polylactic acid into intermediate and/or final products.

Both the rate and extent of hydrolytic degradation may be a function of polymer structure, such as molecular size, shape or isomer ratio; environmental effects such as time, temperature or moisture, additives or impurities, and a number of other potential factors. The presence of acid groups can accelerate the rate of hydrolytic degradation.

Without wishing to be bound by specific temperature ranges, and with the understanding that physical and chemical properties of compounds carry slight variations based on grade, impurities present, molecular weight, stereochemical architecture, chain length, processing conditions and/or the like, polylactic acid based compositions generally have a glass transition temperature (Tg) and a melt temperature of approximately −40 to 65° C. and 155 to 230° C., respectively. Therefore, improving the processability of the above-described polylactic acid based compositions directly relate to a need for providing compositions having, for example, one or more of a reduction in glass transition temperature; increased melting temperature and/or processing temperatures of the material; increased viscosity; increased molecular weight; improved melt strength; and/or changes in acid value and hydroxyl value, the overall result of which is to provide polyester and polyester copolymer based compositions, such as polylactic acid based compositions, having improved processability and stability (e.g., thermal stability and hydrolytic stability).

Without wishing to be bound by theory, it has been discovered that the addition of plasticizer compounds, such as ether based, ester based, and ether-ester based plasticizer compounds having one or more of the compounds described herein, to a polylactic acid based composition yields surprising and unexpected results in terms of: (1) improving the hydrolytic and thermal stability of the resulting compound; (2) reducing the glass transition temperature of the resulting compound; (3) changing the acid value and/or hydroxyl value of the resulting compound; (4) increasing the viscosity of the resulting compound; (5) improving the melt strength of the resulting compound; and (6) increasing the molecular weight of the resulting compound. The above-enumerated results serve to enhance and improve the processability of the resulting compound and stability of the resulting product.

The plasticizers of the present disclosure may include reactive plasticizers having at least one or more functional groups reactive with —COOH or —OH groups. Without wishing to be bound by theory, the reactive plasticizers of the present disclosure may provide a surprising and unexpected latent stability to the underlying polyester or polyester copolymer (e.g., polylactic acid based) compound.

It will be appreciated that by the phrase 'latent stability,' the phrase herein relates to the incorporation reactive plasticizers having reactive functional groups included therein. As a result, if or when the underlying polyester or polyester copolymer begins to degrade, there will be enough functionality from the reactive functional groups (incorporated through the reactive plasticizer compound(s)) to offset any resulting degradation to the underlying compound.

In some instances, latent stability may also be referred to as a latent useful effect tied to the reactive plasticizers of the present disclosure.

With regard to hydrolytic degradation, polyester and polyester copolymer compounds, such as polylactic acid based compositions, have natural hydrophilic properties due to the presence of polar oxygen linkages. As a result, the hydrophilic properties of polylactic acid based compositions give rise to moderate decomposition or degradation in the presence of water or some form of moisture.

More specifically, hydrolysis of polyester and polyester copolymer compounds, such as polylactic acid, generally occurs by random cleavage of the —C—O— ester bond by water molecules. Although the hydrolysis of polylactic acid does not require the presence of a catalyst, and is capable of proceeding under ambient conditions, the hydrolysis of polylactic acid can be accelerated in the presence of high moisture content or water levels, at higher temperatures, and/or in the presence of an acid or in the presence of a base.

Without wishing to be bound by theory, it will be appreciated that the latent stability present in embodiments of the present disclosure (which can be considered a direct result of the presence of reactive plasticizers having at least one or more functional groups reactive with —COOH or —OH groups) can serve to limit, reduce, help prevent, and/or slow down hydrolytic degradation of the polyester or polyester copolymer based compound, such as a polylactic acid based compound.

It will be appreciated that possible mechanisms for the hydrolytic degradation of polylactic acid involve the hydroxyl (—OH) end group of the compound. For example, hydrolytic degradation can be initiated by protonation of the hydroxyl end group, followed by the formation of an intramolecular hydrogen bridge, which may occur more readily in alkaline environments. As another example, nucleophilic attack of the hydroxyl end group can also initiate hydrolytic degradation, which may occur more readily in acidic environments. Whatever the case may be, the hydroxyl end group of a polylactic acid based composition plays a significant role in hydrolytic degradation in any environment (e.g., acidic, neutral or alkaline).

Moreover, with respect to —COOH groups, it will also be appreciated that in proposed mechanisms relating to the degradation of polylactic acid, the rate of degradation may be auto-catalyzed in the presence of carboxylic acid end chains.

As a result, and as mentioned in part above, minimizing the hydroxyl end groups of a polylactic acid based composition will help significantly reduce the rate and/or onslaught of polymer degradation, such as hydrolytic degradation. Accordingly, without wishing to be bound by theory, it will be appreciated that embodiments of the present disclosure having reactive plasticizers, as described above, particularly with functional groups which are reactive with —COOH and —OH groups, can significantly help limit, reduce, help prevent, and/or slow down hydrolytic degradation of the polyester or polyester copolymer based compound, such as a polylactic acid based compound.

In embodiments, compositions of the present disclosure may include a polyester or a polyester copolymer compound. The polyester or polyester copolymer based compound may be aliphatic in nature.

Figure 2:
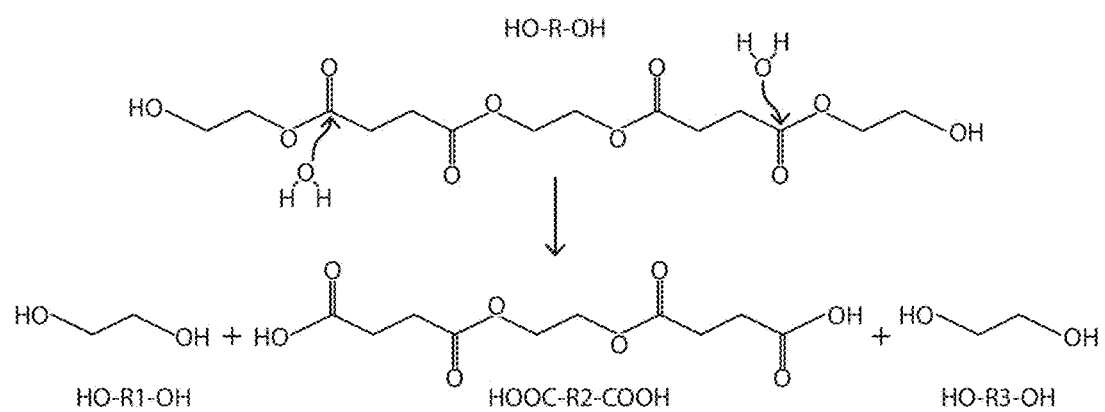
FIG. 2 includes a schematic illustration of the degradation pathway of a polyester such as PET.

In certain embodiments, the polyester or the polyester copolymer can include a hydroxyl-acid based polyester. As used herein, the phrase "hydroxyl-acid based polyester" refers to a polyester, which upon hydrolysis, has a carboxylic acid end-group and an opposing hydroxyl end-group. For example, and in line with the discussion above, FIG. 1 illustrates the degradation pathway of a hydroxyl-acid based polyester where it is seen that upon hydrolysis, the resulting chains each have a carboxylic acid end-group and an opposing hydroxyl end-group. Hydroxyl-acid based polyesters can be differentiated from other common polyesters, such as PET which are made using di-acids and di-ols, in which the degradation pathways can lead to combinations of chains having 1) both ends with acid groups; 2) both ends with hydroxyl groups and 3) having an acid and hydroxyl end groups. For example, FIG. 2 illustrates the hydrolysis degradation pathway of a diol-diacid based polyester, such as PET, where it is seen that upon hydrolysis, combinations of different end group configurations result.

In particular embodiments, the polyester or polyester copolymer compound may be a polylactic acid based compound.

The stereochemistry of the polylactic acid based compound is not particularly limited, and may include a controlled mixture of L- and/or D-isomers. In embodiments, the polylactic acid based composition may be poly(L-lactic) acid, or PLLA. In certain embodiments, the polylactic acid based composition may have small amounts of lactide enantiomers of opposite configuration, such as adding small amounts of D-lactide to L-lactide to yield PDLLA.

In terms of amounts, the polyester or the polyester copolymer compound (such as a polylactic acid based compound) may be present in an amount ranging from about 15 to about 90 wt. %, based on a total weight of the composition. It will be appreciated that all ranges and amounts described herein are intended to include all values contained within the range, including the endpoints of all ranges described herein.

For example, the polyester or the polyester copolymer compound (such as a polylactic acid based compound) may be present in amount of about 15 to about 90 wt. %, such as from about 15 to about 89 wt. %, from about 15 to about 88 wt. %, from about 15 to about 87 wt. %, from about 15 to about 86 wt. %, from about 15 to about 85 wt. %, from about 15 to about 83 wt. %, from about 15 to about 80 wt. %, from about 15 to about 79 wt. %, from about 15 to about 78 wt. %, from about 15 to about 77 wt. %, from about 15 to about 75 wt. %, from about 15 to about 70 wt. %, from about 15 to about 65 wt. %, from about 15 to about 60 wt. %, from about 17 to about 90 wt. %, from about 17 to about 85 wt. %, from about 17 to about 80 wt. %, from about 17 to about 75 wt. %, from about 20 to about 90 wt. %, from about 20 to about 89 wt. %, from about 20 to about 88 wt. %, from about 20 to about 85 wt. %, from about 20 to about 80 wt. %, from about 20 to about 75 wt. %, from about 20 to about 70 wt. %, from about 20 to about 68 wt. %, from about 20 to about 65 wt. %, from about 20 to about 60 wt. %, from about 25 to about 90 wt. %, from about 25 to about 89 wt. %, from about 25 to about 88 wt. %, from about 25 to about 85 wt. %, from about 25 to about 80 wt. %, from about 25 to about 75 wt. %, from about 25 wt. % to about 70 wt. %, from about 30 wt. % to about 90 wt. %, from about 30 wt. % to about 88 wt. %, from about 30 wt. % to about 85 wt. %, or from about 30 wt. % to about 75 wt. %, based on a total weight of the composition.

In terms of upper limits, the polyester or the polyester copolymer compound (such as a polylactic acid based compound) may be present in an amount of no greater than 90 wt. %, such as no greater than 89 wt. %, no greater than about 88 wt. %, no greater than about 87 wt. %, no greater than about 86 wt. %, no greater than about 85 wt. %, no greater than about 84 wt. %, no greater than about 83 wt. %, no greater than about 82 wt. %, no greater than about 81 wt. %, no greater than about 80 wt. %, no greater than about 79 wt. %, no greater than about 78 wt. %, no greater than about 77 wt. %, no greater than about 76 wt. %, no greater than about 75 wt. %, no greater than about 74 wt. %, no greater than about 73 wt. %, no greater than about 72 wt. %, no greater than about 71 wt. %, no greater than about 70 wt. %, no greater than about 69 wt. %, no greater than about 68 wt. %, no greater than about 67 wt. %, no greater than about 66 wt. %, no greater than about 65 wt. %, no greater than about 64 wt. %, no greater than about 63 wt. %, no greater than about 62 wt. %, no greater than about 61 wt. %, or no greater than about 60 wt. %, based on a total weight of the composition.

In terms of lower limits, the polyester or the polyester copolymer compound (such as a polylactic acid based compound) may be present in an amount of at least about 15 wt. %, such as at least about 16 wt. %, at least about 17 wt. %, at least about 18 wt. %, at least about 19 wt. %, at least about 20 wt. %, at least about 21 wt. %, at least about 22 wt. %, at least about 23 wt. %, at least about 24 wt. %, at least about 25 wt. %, at least about 26 wt. %, at least about 27 wt. %, at least about 28 wt. %, at least about 29 wt. %, at least about 30 wt. %, at least about 31 wt. %, at least about 32 wt. %, at least about 33 wt. %, at least about 34 wt. %, at least about 35 wt. %, at least about 36 wt. %, at least about 37 wt. %. at least about 38 wt. %, at least about 39 wt. %, at least about 40 wt. %, at least about 41 wt. %, at least about 42 wt. %, at least about 43 wt. %, at least about 44 wt. %, at least about 45 wt. %, or at least about 50 wt. %, based on a total weight of the composition.

Compositions of the present disclosure may also contain a plasticizer, such as an ether based plasticizer, an ether-ester based plasticizer, an ester based plasticizer, or any combination thereof. In certain embodiments, the composition may contain an ether-ester based plasticizer.

In cases where the plasticizer is an ether-ester based plasticizer, the exact identity of the plasticizer compound is not particularly limiting.

In embodiments, the plasticizer may have at least one of the following compounds included therein: an epoxy based compound, a polycarbodiimide based compound, a phosphite containing compound, a hindered phenol, a bi-cyclic-imino ether, a bi-cyclic-imino ester, a hindered amine, 2,2'-bis(2-oxazoline) based molecules, isocyanates, di-isocyanates, and a combination thereof.

In certain embodiments, the plasticizer may have one or more of the aforementioned compounds included therein, such as at least two, at least three, at least four, or at least five of the aforementioned compounds. This may apply whether the plasticizer is ether based, ether-ester based, ester based, or any combination thereof.

In certain embodiments, the plasticizer may have at least three of the aforementioned compounds included therein. This also may apply whether the plasticizer is ether based, ether-ester based, ester based, or any combination thereof.

In embodiments of the present disclosure having more than one of the aforementioned compounds included with the plasticizer, such as embodiments having at least two, at least three, at least four or at least five of the aforementioned compounds, in certain embodiments, the compounds may each be different, or some of them may be identical. Simply to provide an illustrative example, in certain embodiments, the plasticizer may have two compounds A and one compound B; or one compound C and one compound D, whereby A, B, C and D are any one of the compounds listed above, such as an epoxy based compound, a polycarbodiimide based compound, a phosphite containing compound, a hindered phenol, a bi-cyclic-imino ether, a bi-cyclic-imino ester, a hindered amine, 2,2'-bis(2-oxazoline) based molecules, isocyanates, di-isocyanates, and a combination thereof.

In embodiments of the present disclosure, the above-described compounds may be covalently attached to the plasticizer, whether the plasticizer is ether based, ether-ester based, ester based, or any combination thereof.

In certain embodiments where the plasticizer may have one or more of the aforementioned compounds included therein (e.g., hindered phenol, di-isocyanates, and the like), the compounds may each be different, or some of the compounds may be identical, as described above. This may apply regardless of whether the plasticizer is ether based, ether-ester based, ester based, or any combination thereof.

For example, an exemplary embodiment of the present disclosure may include a plasticizer having an epoxy based compound and a hindered amine included therewith. Another exemplary embodiment of the present disclosure may include a plasticizer having two epoxy based compounds, a hindered phenol, and a polycarbodiimide based compound included therewith. In both exemplary embodiments, the plasticizer may also be ether based, ether-ester based, ester based, and/or any combination thereof.

In exemplary embodiments, suitable plasticizers, whether ether based, ether-ester based, ester based, or any combination thereof, may include bis-[2-(2-butoxyethoxy)ethyl] hexane dioate, and/or may include tris nonyl phenyl phosphite.

In terms of amounts, the plasticizer may be present in compositions of the present disclosure in an amount ranging from about 0.1 to about 55 wt. %, based on a total weight of the composition. It will be appreciated that all ranges and amounts described herein are intended to include all values contained within the range, including the endpoints of all ranges described herein.

For example, the plasticizer may be present in an amount of from about 0.1 to about 55 wt. % based on a total weight of the composition, such as from about 0.2 to about 55 wt. %, from about 0.3 to about 55 wt. %, from about 0.4 to about 55 wt. %, from about 0.5 to about 55 wt. %, from about 0.75 to about 55 wt. %, from about 1 to about 55 wt. %, from about 3 to about 55 wt. %, from about 5 to about 55 wt. %, from about 7 to about 55 wt. %, from about 10 to about 55 wt. %, from about 12 to about 55 wt. %, from about 15 to about 55 wt. %, from about 16 to about 55 wt. %, from about 18 to about 55 wt. %, from about 20 to about 55 wt. %, from about 25 to about 55 wt. %, from about 0.1 to about 50 wt. %, from about 0.5 to about 50 wt. %, from about 0.75 to about 50 wt. %, from about 1 to about 50 wt. %, from about 5 to about 50 wt. %, from about 7 to about 50 wt. %, from about 10 to about 50 wt. %, from about 15 to about 50 wt. %, from about 0.1 to about 45 wt. %, from about 5 to about 4 wt. %, from about 10 to about 45 wt. %, or from about 25 to about 50 wt. %, based on a total weight of the composition.

In terms of upper limits, the plasticizer may be present in the composition in an amount of no greater than about 55 wt. %, based on a total weight of the composition, such as no greater than about 54 wt. %, no greater than about 53 wt. %, no greater than about 52 wt. %, no greater than about 51 wt. %, no greater than about 50 wt. %, no greater than about 49 wt. %, no greater than about 48 wt. %, no greater than about 47 wt. %, no greater than about 46 wt. %, no greater than about 45 wt. %, no greater than about 44 wt. %, no greater than about 43 wt. %, no greater than about 42 wt. %, no greater than about 41 wt. %, or no greater than about 40 wt. %, based on a total weight of the composition.

In terms of lower limits, the plasticizer may be present in the composition in an amount of at least about 0.1 wt. %, based on a total weight of the composition, such as at least about 0.2 wt. %, at least about 0.3 wt. %, at least about 0.4 wt. %, at least about 0.5 wt. %, at least about 0.6 wt. %, at least about 0.7 wt. %, at least about 0.8 wt. %, at least about 0.9 wt. %, at least about 1 wt. %, at least about 2 wt. %, at least about 3 wt. %, at least about 4 wt. %, at least about 5 wt. %, at least about 6 wt. %, at least about 7 wt. %, at least about 8 wt. %, at least about 9 wt. %, at least about 10 wt. %, at least about 11 wt. %, at least about 12 wt. %, at least about 13 wt. %, at least about 14 wt. %, at least about 15 wt. %, at least about 16 wt. %, at least about 17 wt. %, at least about 18 wt. %, at least about 19 wt. %, at least about 20 wt. %, at least about 21 wt. %, at least about 22 wt. %, at least about 23 wt. %, at least about 24 wt. %, or at least about 25 wt. %, based on a total weight of the composition.

In very particular embodiments, the one or more plasticizers can be described as a reactive plasticizer. It is to be understood the composition can include further plasticizers in a addition to a reactive plasticizer as described in more detail herein.

The reactive plasticizer can be present in the composition in an amount of at least about 0.1 wt. %, based on a total weight of the composition, such as at least about 0.2 wt. %, at least about 0.3 wt. %, at least about 0.4 wt. %, at least about 0.5 wt. %, at least about 0.6 wt. %, at least about 0.7 wt. %, at least about 0.8 wt. %, at least about 0.9 wt. %, at least about 1 wt. %, at least about 2 wt. %.

In terms of upper limits, the plasticizer may be present in the composition in an amount of no greater than about 30 wt. %, no greater than about 25 wt. %, no greater than about 20 wt. %, no greater than about 15 wt. %, no greater than about 10 wt. %, no greater than about 8 wt. %, no greater than about 6 wt. %, no greater than about 5 wt. %, or even no greater than about 4 wt. %, based on the total weight of the composition.

In very particular embodiments, the reactive plasticizer can be present in the composition in an amount of at least 1.5 wt. %. In other very particular embodiments, the reactive plasticizer can be present in the composition in an amount of no greater than 10 wt. %.

As described above, the plasticizers of the present disclosure may include reactive plasticizers having at least one or more functional groups reactive with —COOH, —OH, amide, and/or urea groups as described above. In very particular embodiments, the reactive plasticizer can have any of the functionalities described above, such as epoxy functionality. The reactive plasticizers can be described in terms of their functionality, i.e. a numerical representation of the amount of functional groups present in a compound.

In certain embodiments, the plasticizers of the present disclosure can have a functionality of at least 1, at least 2, at least 3, at least 4, at least 5, at least 6, at least 7, at least 8, at least 9, at least 10, or even at least 11. In other embodiments, the plasticizers of the present disclosure can have a functionality of no greater than 30, no greater than 25, no greater than 24, no greater than 23, no greater than 22, no greater than 21, or even no greater than 20. Moreover, the plasticizers of the present disclosure can have a functionality within a range of any of the minimum or maximum values described above, such as in a range of 1 to 30, or even in a range of 5 to 25. Suitable methods to measure the functionality of a reactive plasticizer are well understood in the art. For example, the functionality of the plasticizer can be measured according to MALDI as is well understood in the art. For example, the epoxy functionality of an epoxy functional reactive oligomer depends on the mole percent of glycidyl methacrylate in the copolymer (M) and the degree of polymerization (molecular weight) of the chains (DP). Thus, functionality can be determined by multiplying M×DP.

Composition embodiments of the present disclosure may also comprise a triblock copolymer. Suitable triblock copolymer include, but are not limited to, a polyethylene glycol triblock copolymer, a poly(ethylene glycol co-propylene glycol) triblock copolymer, and a poly(oligoethylene glycol) acrylate triblock copolymer, and combinations thereof.

In terms of amount, the triblock copolymer may be present in an amount ranging from about 1 to about 40 wt. %, based on a total weight of the composition. It will be appreciated that all ranges and amounts described herein are intended to include all values contained within the range, including the endpoints of all ranges described herein.

For example, the triblock copolymer may be present in an amount of from about 1 to about 40 wt. %, based on a total weight of the composition, such as from about 1 to about 39 wt. %, from about 1 to about 38 wt. %, from about 1 to about 37 wt. %, from about 1 to about 36 wt. %, from about 1 to about 35 wt. %, from about 1 to about 1 to about 34 wt. %, from about 1 to about 30 wt. %, from about 5 to about 40 wt. %, from about 5 to about 38 wt. %, from about 5 to about 37 wt. %, from about 5 to about 35 wt. %, from about 5 to about 30 wt. %, from about 10 to about 40 wt. %, from about 10 to about 38 wt. %, from about 10 to about 35 wt. %, from about 10 to about 30 wt. %, or from about 10 to about 28 wt. %, based on a total weight of the composition.

In terms of upper limits, the triblock copolymer may be present in an amount of no greater than about 40 wt. %, based on a total weight of the composition, such as no greater than about 39 wt. %, no greater than about 38 wt. %, no greater than about 37 wt. %, no greater than about 36 wt. %, no greater than about 35 wt. %, no greater than about 34 wt. %, no greater than about 33 wt. %, no greater than about 32 wt. %, no greater than about 31 wt. %, or no greater than about 30 wt. %, based on a total weight of the composition.

In terms of lower limits, the triblock copolymer may be present in an amount of at least about 0.1 wt. %, based on a total weight of the composition, such as at least about 0.2 wt. %, at least about 0.3 wt. %, at least about 0.4 wt. %, at least about 0.5 wt. %, at least about 0.6 wt. %, at least about 0.7 wt. %, at least about 0.8 wt. %, at least about 0.9 wt. %, at least about 1 wt. %, at least about 2 wt. %, at least about 3 wt. %, at least about 4 wt. %, at least about 5 wt. %, at least about 6 wt. %, at least about 7 wt. %, at least about 8 wt. %, at least about 9 wt. %, at least about 10 wt. %, at least about 11 wt. %, at least about 12 wt. %, at least about 13 wt. %, at least about 14 wt. %, at least about 15 wt. %, at least about 17 wt. %, or at least about 20 wt. %, based on a total weight of the composition.

Composition embodiments of the present disclosure may comprise a glass transition temperature (Tg) of less than about 65° C., such as less than about 64° C., less than about 63° C., less than about 62° C., less than about 61° C., less than about 60° C., less than about 59° C., less than about 58° C., less than about 57° C., less than about 56° C., less than about 55° C., less than about 54° C., less than about 53° C., less than about 52° C., less than about 51° C., less than about 50° C., less than about 49° C., less than about 48° C., less than about 47° C., less than about 46° C., less than about 45° C., or less than about 44° C.

In terms of lower limits, compositions of the present disclosure may comprise a glass transition temperature (Tg) of at least −65° C., such as at least −60° C., at least −55° C., at least −53° C., at least −50° C., at least −48° C., at least −45° C., at least −42° C., at least −40° C., at least −35° C., at least −30° C., at least −28° C., at least −25° C., at least −20° C., at least −15° C., at least −10° C., at least −9° C., at least −8° C., at least −7° C., at least −6° C., at least −5° C., at least −4° C., at least −3° C., at least −2° C., at least 0° C., at least 10° C., at least 15° C., at least 18° C., at least 20° C., at least 22° C., at least 25° C., at least 30° C., at least 36° C., at least 37° C., at least 38° C., at least 39° C., at least 40° C., at least 41° C., at least 42° C., at least 43° C., at least 44° C., at least 45° C., at least 46° C., at least 47° C., at least 48° C., at least 49° C., or at least 50° C.

Glass transition temperature can be measured using differential scanning calorimetry, di-electric testing, DMTA, and rheological methods. The use of plasticizer in polyester blends, effectively broadens the glass transition temperature, specifically in a polyester such as PLA where the addition of a plasticizer shifts the onset of Tg from approximately 60 C to as low as −40 C with a range of temperatures which span the transition Acid value (or "neutralization number" or "acid number" or "acidity") can generally be defined as the mass of potassium hydroxide (KOH) in milligrams that is required to neutralize one gram of chemical substance. In laboratory settings, a known amount of a sample dissolved in organic solvent is titrated with a solution of potassium hydroxide of a known concentration, and with phenolphthalein as a color indicator.

The acid value can be generally used as one way to quantify the amount of acid present, by representing the quantity of base, expressed in milligrams of potassium hydroxide that is required to neutralize the acidic constituents in 1 g of sample. Polyesters, when degraded, produce acid end group functionality, so the quantification of acid value has a direct correlation to the degree of degradation.

As such, composition embodiments of the present disclosure may comprise an acid value of less than about 25 mgKOH/g, such as less than about 24.5 mgKOH/g, less than about 24 mgKOH/g, less than about 23.5 mgKOH/g, less than about 23 mgKOH/g, less than about 22.5 mgKOH/g, less than about 22 mgKOH/g, less than about 21.5 mgKOH/g, less than about 21 mgKOH/g, less than about 20.5 mgKOH/g, less than about 20 mgKOH/g, less than about 19.5 mgKOH/g, less than about 19 mgKOH/g, less than about 18.5 mgKOH/g, less than about 18 mgKOH/g, less than about 17.5 mgKOH/g, less than about 17 mgKOH/g, less than about 16.5 mgKOH/g, less than about 16 mgKOH/g, less than about 15.5 mgKOH/g, less than about 15 mgKOH/g, less than about 14.5 mgKOH/g, less than about 14 mgKOH/g, less than about 13.5 mgKOH/g, less than about 13 mgKOH/g, less than about 12.5 mgKOH/g, less than about 12 mgKOH/g, less than about 11.5 mgKOH/g, less than about 11 mgKOH/g, less than about 10.5 mgKOH/g, less than about 10 mgKOH/g, less than about 9.5 mgKOH/g, less than about 9 mgKOH/g, less than about 8.5 mgKOH/g, less than about 8 mgKOH/g, less than about 7.5 mgKOH/g, less than about 7 mgKOH/g, less than about 6.5 mgKOH/g, less than about 6 mgKOH/g, less than about 5.5 mgKOH/g, less than about 5 mgKOH/g, less than about 4.5 mgKOH/g, less than about 4 mgKOH/g, less than about 3.5 mgKOH/g, or less than about 3 mgKOH/g.

In terms of lower limits, compositions of the present disclosure may comprise an acid value of at least about 0.01 mgKOH/g, such as at least about 0.05 mgKOH/g, at least about 0.07 mgKOH/g, at least about 0.09 mgKOH/g, at least about 0.1 mgKOH/g, at least about 0.15 mgKOH/g, at least about 0.17 mgKOH/g, at least about 0.2 mgKOH/g, at least about 0.25 mgKOH/g, at least about 0.28 mgKOH/g, at least about 0.3 mgKOH/g, at least about 0.35 mgKOH/g, at least about 0.4 mgKOH/g, at least about 0.5 mgKOH/g, at least about 0.75 mgKOH/g, at least about 0.8 mgKOH/g, at least about 0.9 mgKOH/g, at least about 0.95 mgKOH/g, at least about 0.99 mgKOH/g, at least about 1 mgKOH/g, at least about 1.25 mgKOH/g, at least about 1.5 mgKOH/g, at least about 1.75 mgKOH/g, at least about 2 mgKOH/g, at least about 2.25 mgKOH/g, at least about 2.4 mgKOH/g, at least about 2.5 mgKOH/g, at least about 2.75 mgKOH/g, at least about 2.85 mgKOH/g, at least about 3 mgKOH/g, at least about 3.25 mgKOH/g, at least about 3.4 mgKOH/g, at least about 3.45 mgKOH/g, at least about 3.5 mgKOH/g, at least about 3.75 mgKOH/g, at least about 3.9 mgKOH/g, at least about 4 mgKOH/g, at least about 4.15 mgKOH/g, at least about 4.25 mgKOH/g, at least about 4.4 mgKOH/g, at least about 4.5 mgKOH/g, at least about 4.75 mgKOH/g, at least about 5 mgKOH/g, at least about 5.25 mgKOH/g, at least about 5.5 mgKOH/g, at least about 6 mgKOH/g, at least about 6.25 mgKOH/g, at least about 6.5 mgKOH/g, at least about 6.75 mgKOH/g, at least about 7 mgKOH/g, at least about 7.25 mgKOH/g, at least about 7.5 mgKOH/g, at least about 7.75 mgKOH/g, at least about 8 mgKOH/g, at least about 8.25 mgKOH/g, at least about 8.5 mgKOH/g, at least about 8.75 mgKOH/g, at least about 9 mgKOH/g, at least about 9.25 mgKOH/g, at least about 9.5 mgKOH/g, at least about 9.75 mgKOH/g, at least about 9.75 mgKOH/g, at least about 10 mgKOH/g, at least about 10.25 mgKOH/g, at least about 10.5 mgKOH/g, at least about 11 mgKOH/g, at least about 11.5 mgKOH/g, at least about 11.75 mgKOH/g, at least about 12 mgKOH/g, at least about 12.5 mgKOH/g, at least about 12.75 mgKOH/g, at least about 13, mgKOH/g, at least about 13.5 mgKOH/g, at least about 13.75 mgKOH/g, at least about 14 mgKOH/g, at least about 14.5 mgKOH/g, at least about 14.75 mgKOH/g, or at least about 15 mgKOH/g.

Hydroxyl value is a measure of the content of free hydroxyl groups in a compound. Specifically, hydroxyl value is useful as an indicator of the presence of end groups from any resultant degradation and/or hydrolysis. Hydroxyl value can be expressed as the mass of potassium hydroxide (KOH) in milligrams equivalent to the hydroxyl content of one gram of the chemical substance, corrected for carboxyl hydroxyl groups by titration of an unacetylated sample of the same material.

As such, composition embodiments of the present disclosure may comprise a hydroxyl value of less than about 1100 mgKOH/g, such as less than about 1000 mgKOH/g, less than about 975 less than about mgKOH/g, less than about 950 mgKOH/g, less than about 925 mgKOH/g, 900 mgKOH/g, less than about 875 mgKOH/g, less than about 850 mgKOH/g, less than about 825 mgKOH/g, less than about 800 mgKOH/g, less than about 775 mgKOH/g, less than about 750 mgKOH/g, less than about 725 mgKOH/g, less than about 700 mgKOH/g, less than about 675 mgKOH/g, less than about 650 mgKOH/g, less than about 625 mgKOH/g, less than about 600 mgKOH/g, less than about 575 mgKOH/g, less than about 550 mgKOH/g, less than about 525 mgKOH/g, or less than about 500 mgKOH/g.

In terms of lower limits, composition embodiments of the present disclosure may comprise a hydroxyl value of at least about 300 mgKOH/g, such as at least about 325 mgKOH/g, at least about 350 mgKOH/g, at least about 375 mgKOH/g, at least about 400 mgKOH/g, at least about 425 mgKOH/g, at least about 450 mgKOH/g, at least about 475 mgKOH/g, at least about 500 mgKOH/g, at least about 525 mgKOH/g, at least 550 mgKOH/g, at least about 575 mgKOH/g, at least about 600 mgKOH/g, at least about 625 mgKOH/g, at least about 650 mgKOH/g, at least about 675 mgKOH/g, at least about 700 mgKOH/g, at least about 725 mgKOH/g, at least about 750 mgKOH/g, at least about 775 mgKOH/g, at least about 800 mgKOH/g, at least about 825 mgKOH/g, at least about 850 mgKOH/g, at least about 875 mgKOH/g, or at least about 900 mgKOH/g.

Composition embodiments of the present disclosure may also exhibit desirable modules (MPa) values. In particular embodiments, composition embodiments of the present disclosure may have a modulus of at least 90 MPa, at least 95 MPa, at least 100 MPa, at least 105 MPA, at least 110 MPA, or even at least 120 MPa.

Composition embodiments of the present disclosure may also exhibit an increase in viscosity. To demonstrate this, the viscosity may be measured at a temperature above a melt state or generally a melt temperature range of the composition.

For example, the viscosity may be measured at a temperature of 2° C. above the melt state of the composition, such as at a temperature of 3° C. above the melt state of the composition, 4° C. above the melt state of the composition, 5° C. above the melt state of the composition, 6° C. above the melt state of the composition, 7° C. above the melt state of the composition, 8° C. above the melt state of the composition, 9° C. above the melt state of the composition, 10° C. above the melt state of the composition, 11° C. above the melt state of the composition, 12° C. above the melt state of the composition, or 15° C. above the melt state of the composition.

In embodiments, the increase in viscosity of the composition being examined is measured in comparison to the viscosity of a comparative composition, the viscosities of both being measured at the same temperature above the melt state of both compositions. In embodiments, the phrase "comparative composition" is used herein to represent a composition comprising an identical grade of polyester or polyester copolymer (such as polylactic acid based compound), without having a functional plasticizer component present therein.

Without wishing to be bound by theory, it is believed that the presence of a plasticizer with one or more reactive functional groups (i.e. reactive plasticizer), as described above, surprisingly and unexpectedly yields increased stability in the polyester or polyester copolymer (such as polylactic acid) based composition. The stability may be manifested in the form of thermal and/or hydrolytic stability and may, for example, be further embodied by an increase in viscosity.

Moreover, it will be appreciated that in embodiments where compositions may include additional fillers and additives, such as UV stabilizers, antioxidants, fragrances, dyes, thickening agents, foaming agents, and the like—the presence of any one of these to the composition will also be added or present to the comparative composition, to provide a suitable measuring indicator for increases in viscosity.

The methodology for measuring the viscosity is not particularly limited. For example, viscosity may be measured by a cone and plate, a parallel plate or a capillary rheology methodology.

Viscosity can be measured through cone and plate, plate and plate, capillary, or other rheological methods.

It will be appreciated that compositions of the present disclosure may be used (or be modified for use, as the case may be) in various conventional forming processes, including but not limited to injection molding, extrusion, extrusion molding, blow molding, thermoforming, sheet extrusion, rotational molding, foam molding, compression molding, fiber forming, and the like.

Formed products made from compositions of the present disclosure are capable of holding their shape under normal conditions.

It will also be appreciated that compositions of the present disclosure have several applications and may be incorporated and/or used to form various products and devices.

For example and without intending to be limiting, compositions of the present disclosure may be incorporated in flexible tubing applications. Compositions of the present disclosure may also be incorporated and/or used to form rigid thermoforms, packaging, pharmaceutical applications, soft touch applications, grip applications, biomedical applications (such as implants, sutures, drug encapsulation, fluid withdrawal, transplant, preservation and/or storage), medical device applications, biaxially oriented films, disposable products, beverage holders and cups, bottles, food and various storage containers, industrial containers, pipes, clothing and fashion apparel, textiles and textile products, non-wovens, liners, household and industrial fabrics (e.g., bedding, curtains, covers, drapery, sheets), carpet, fiberfill (e.g., pillows, comforters, blankets, quilts, mattresses, mattress covers, duvets), foams, and any combinations thereof.

The present disclosure will be illustrated further in the following Examples.

EXAMPLES

Raw Materials Used

PLLA (4.2% D) (PLA 2002D) was obtained from NATUREWORKS.

Molecular plasticizer bis-[2-(2-butoxyethoxy)ethyl] hexane dioate was obtained from DOW CHEMICAL.

PDLA 2800-PEPG 12000-PDLA 2800 triblock copolymer was synthesized according to the following procedure:

The triblock copolymers were synthesized by ring-opening polymerization (ROP) of D-lactide using the hydroxyl terminated soft block as an initiator and stannous octoate as a catalyst. Depending on the miscibility of the midblock with PDLA either solution polymerization or bulk polymerization conditions were used to synthesize the triblock copolymers. The two triblock copolymers synthesized are PDLA40-PEPG12k-PDLA40 and PDLA60-EB10k-PDLA60. The nomenclature used is PDLAn-SoftBlockm-PDLAn, where n stands for the degree of polymerization of PDLA with lactic acid as a repeat unit and m stands form the number average molecular weight of the soft mid-block. For example 12k stands for 12,000 g/mol.

The required amount of PEPG12000 was placed in a flame dried Schlenk flask and subjected to azeotropic distillation with toluene. D-lactide was then added under a nitrogen atmosphere and the flask was placed in an oil bath maintained at 130° C. After 15 min, the required amount of stannous octoate in ~0.5 ml toluene was injected into the flask. At the end of 6 h of reaction time the polymer obtained was dissolved in dichloromethane, precipitated in diethyl ether and dried in vacuo. The reaction was conducted on a 60 g scale.

The reaction steps involved in the synthesis of poly (ethylene-butylene) based triblock copolymer are as follows: the as-received polymer (LBH10k) was hydrogenated to obtain poly(ethylene-butylene) copolymer (EB10k) in order to prevent undesired side reactions during the subsequent processing steps. Hydrogenation was performed in a high pressure hydrogenation reactor on a 10 wt % dry cyclohexane solution of the polymer using 10 wt % Pd on activated charcoal as the catalyst at ~100 degrees Celsius and 120 psi hydrogen pressure for 12 hours. The poly (ethylene butylene) copolymer was then transferred to a flame dried Schlenk flask and subjected to azeotropic distillation with toluene. D-Lactide was then added to the flask under nitrogen followed by the addition of toluene (three times the amount of reactants). The flask was then immersed in an oil bath maintained at 110° C. and the required amount of stannous octoate in ~1 ml toluene was injected into the flask. After 24 h the reaction was stopped, and the polymer was obtained by precipitation in excess methanol followed by drying in vacuo.

Glycidyl methacrylate (GMA), 2-(2-ethoxyethoxy ethyl) acrylate (E2EA), methyl isobutyl ketone (MIBK), dicumyl peroxide (DCP) and 1-octanethiol were purchased from Sigma Chemical Co. GMA and E2EA were passed through a basic alumina column to remove the inhibitor before polymerization.

Reactive oligomer (chain extender) Joncryl 4385 (EEW 450 g/eq) was obtained from BASF. This reactive oligomer will be referred to as CE450 and has a low epoxy functionality (1-4)

Reactive oligomer (chain extender) Joncryl 4368 (EEW 285 g/eq) was obtained from BASF. This reactive oligomer will be referred to as CE285 and has a medium epoxy functionality (2-7)

Reactive oligomer Pluss optiPET (EEW 215 g/eq) was obtained from Pluss Polymers pvt ltd. This reactive oligomer will be referred to as CE215 and has a high epoxy functionality (5-12).

To produce a sample with very high epoxy functionality and low Tg, an epoxy functional copolymer was synthesized by copolymerizing glycidyl methacrylate with 2-(2-ethoxyethoxy ethyl) acrylate (E2EA). Synthesis was performed using free radical polymerization of E2EA and GMA at 120° C. in methyl isobutyl ketone (MIBK) using dicumyl peroxide (DCP) as the initiator and 1-octanethiol as the chain transfer agent. To obtain a copolymer with 57 mol % GMA [P(E2EA-co-57GMA)] with an epoxy equivalent weight of 285 g/eq and molecular weight of ~12000 g/mol the following procedure was used. In a 25 ml round bottom flask 3.8 ml (28.5 mmol) of GMA and 4.4 ml E2EA (21.5 mmol) were taken along with 0.08 g DCP (1 wt %, 0.03 mmol), 0.07 ml 1-octanethiol (0.43 mmol) ([Monomer]/[Chain transfer agent]=115) and 12.5 ml MIBK. The above mixture was degassed for one hour with N2 and placed in an oil bath at 120° C. The reaction was continued for six hours. At the end of the reaction the solvent MIBK was removed using a rotary evaporator and the copolymer was obtained as a viscous liquid. It was further dried in vacuo at 120° C. to remove trace amounts of solvent. This copolymer will be referred to as S285 and has a very high functionality (greater than 15).

Six different sample compositions were produced and tested. The 6 different samples were produced as follows:

The blends were prepared by using a 15 cc DSM twin screw mini-extruder. The triblock copolymer, PLLA, plasticizer and the reactive oligomer were introduced into the extruder and mixed for 7 min at 190 degrees Celsius and 80 rpm. The melt force was monitored during the melt mixing to follow the reaction. Dog-bone samples for tensile testing were obtained using a 10 cc DSM mini-injection mold. The pressure used was 3 bar and the mold was maintained at 40 degrees Celsius for 2 minutes. The blends prepared are shown in Table 1 below and contain 3-5 wt % of the reactive oligomers. In all blends 1.3-1.6 mmol epoxy groups are present, well in excess of the amount of carboxylic acid groups present (0.6 mmol) as determined by acid value measurements on the processed blend. Because of the lower epoxy equivalent weight of CE 450, a higher amount of CE 450 is used (5 wt %, blend D) to keep the epoxy content similar to the other blends. The amount of reactive oligomer used is higher than that used in the literature for unmodified PLA (1 wt %), as experiments showed that there was no increase in molecular weight in blends containing 1 wt % of the reactive oligomers.

TABLE 1

| | Blend Preparation | | | | |
| --- | --- | --- | --- | --- | --- |
| Sample | PLLA (wt %) | triblock (wt %) | Plasticizer (wt %) | Epoxy functional oligomer (wt %) | epoxy supplied (mmol) |
| J0 | 60 | 30 | 10 | 0    None | 0 |
| A | 59 | 29 | 9 | 3    S 285 | 1.3 |
| B | 59 | 29 | 9 | 3    CE 215 | 1.6 |
| C | 59 | 29 | 9 | 3    CE 285 | 1.3 |
| D | 57 | 29 | 9 | 5    CE 450 | 1.4 |

Techniques and Measurement Methods

H-Nuclear magnetic resonance (NMR) (300 MHz) spectra were obtained using a Bruker DPX-300 NMR spectrometer. The spectra were measured in CDCl3, and the chemical shifts were calibrated to the solvents' residual proton signal (1H NMR signal: δ 7.26 ppm for CHCl3).

The molecular weight and dispersity were determined by GPC (chloroform) (Agilent). The molecular weights measured were with respect to polystyrene standards. MALDI was used for absolute molecular weight measurement.

Acid value was determined by titration of a 20 ml of 15 mg/ml chloroform solution of the polymer against 0.1 N alcoholic KOH. Titration was continued till neutral pH was reached. pH was monitored using an Oakton pH1100 pH meter.

Thermal characterization was performed on a TA Q 100 differential scanning calorimeter (DSC) (TA Instruments) which was calibrated against an indium standard. The samples (5-10 mg) were heated at the rate of 20° C. min-1 in the first cycle to study the morphology of the samples formed under the processing conditions.

Tensile testing was performed using an Instron universal testing machine according to ASTM D638 standard for tensile testing, using type IV dog bones specimens. Testing was performed at a crosshead speed of 50.8 mm/min with a 5 kN load cell. For each sample, 3 individual specimens were tested in 3 individual analyses and the reported data are the calculated means.

Example 1

Functionality

The epoxy functionality (F) of the reactive oligomers depends on:

a. i) Mole percent of glycidyl methacrylate in the copolymer (M)

b. ii) Degree of polymerization (molecular weight) of the chains (DP)

Accordingly, the epoxy functionality (F) can be determined by the following equation:

$$F = M \times DP \quad \text{(eq. 1)}$$

To determine the functionality, the mole percent of GMA in the copolymer and the degree of polymerization of the chains are calculated. The mole percent of glycidyl methacrylate in the copolymer can be determined from the epoxy equivalent weight of the copolymer and the molecular weight of the co-monomer used. As known from literature, the reactive oligomers described above are copolymers of glycidyl methacrylate (GMA), styrene (S) and butyl acrylate (BA). To determine the mole percent of GMA in these copolymers using the epoxy equivalent weight, it is assumed that these copolymers consist of GMA and comonomer B. Calculations are done assuming comonomer B is S or BA to get a range for the mole percent of GMA in these copolymers. As shown in Table 2 below, the range of GMA mole percent estimated copolymer CE215 is 59-64% while for CE285 is 42-47%. In case of CE450, it is known from IR and DSC data that the comonomer is butyl acrylate. The calculated GMA mole percent for this copolymer is 29%.

TABLE 2

Estimation of mole percent of GMA in the copolymers (reactive

| Copolymer | Comonomer | GMA (mol %) | Comonomer (mol %) | Comonomer MW (g/mol) | EEW (g/eq) |
|---|---|---|---|---|---|
| CE215 | Styrene | 59 | 41 | 104 | 214 |
|  | Butylacrylate | 64 | 36 | 128 | 214 |
| CE285 | Styrene | 42 | 58 | 104 | 186 |
|  | Butylacrylate | 47 | 53 | 128 | 286 |
| CE450 | Butylacrylate | 29 | 71 | 128 | 455 |

Figure 3:
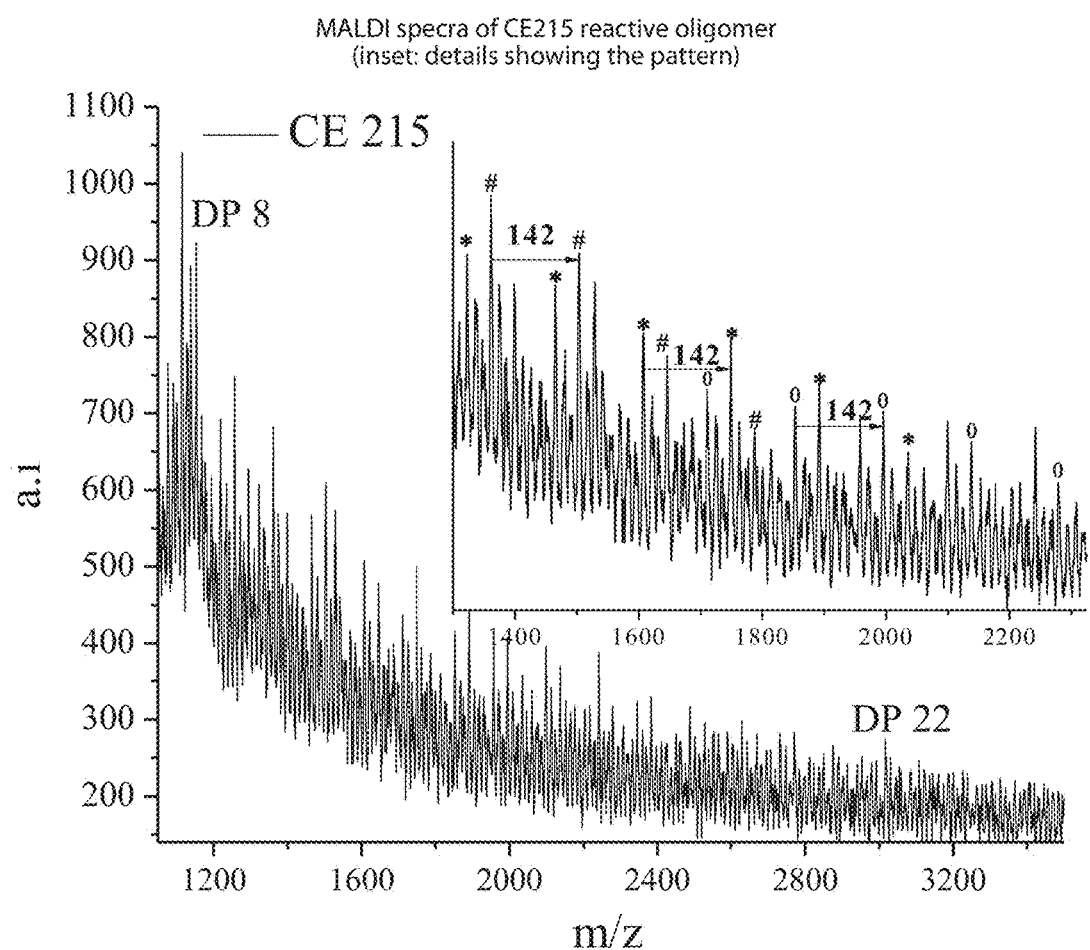
FIG. 3 includes a MALDI spectra of a reactive oligomer according to an example.

In order to estimate the degree of polymerization of the three copolymers, a combination of MALDI and GPC was used. MALDI data was obtained on the CE 215 copolymer and is shown in FIG. 3. The range of DP estimated is from 8-22 units assuming a composition of 60 mol % GMA and 40 mol % Styrene as illustrated in Table 2 above. As the dispersity of these copolymers is ~3 there is a wide range in the DP. It can be seen in inset graph in FIG. 3, that there is a pattern in the spectra with peaks separated by 142 atomic mass units, the molecular weight of glycidyl methacrylate. These peaks correspond to chains differing by one GMA unit.

Figure 4:
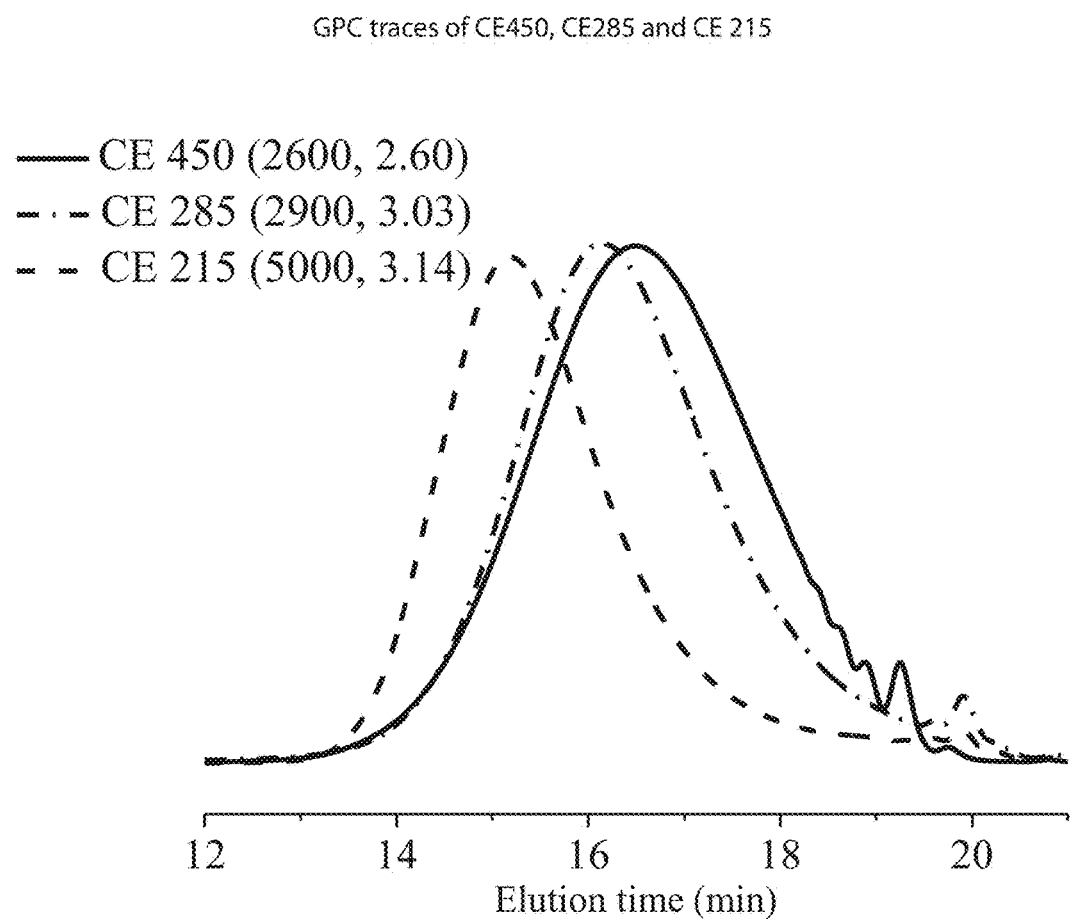
FIG. 4 includes GPC traces of reactive oligomers according to an example.

To estimate the DP of CE 450 and CE 285 the following procedure was followed. FIG. 4 shows the GPC traces of the three copolymers. The number average molecular weights obtained from GPC allows comparison of the molecular weights of CE 215 with CE 285 and CE 450. Comparison of the relative molecular weights shows that CE 285 and CE450 have molecular weights ~0.6 and 0.5 times that of CE 450 as shown in Table 3 below, with similar dispersities. Thus the degree of polymerization can be estimated and is shown in Table 3. It should be noted that this analysis should not be treated as an absolute measure of degree of polymerization. It allows a comparison of the DP of CE 215 with CE 285 and CE 450. As the DP and the mole percent of GMA in the copolymers is known, the epoxy functionality can be estimated using equation 1 as shown above. The estimates of the epoxy functionality provided in Table 3 below.

TABLE 3

Estimation of DP and functionality of the copolymers

| Copolymer | GPC ($M_n$, g/mol) | Factor | DP range | GMA (mol %) | Functionality |
|---|---|---|---|---|---|
| CE215 | 5000 | 1 | 8-20* | 66 | 5-11 |
| CE285 | 3000 | 0.6 | 4-16 | 41 | 2-7 |
| CE450 | 2600 | 0.5 | 3-15 | 29 | 1-4 |

*From MALDI

Figure 5:
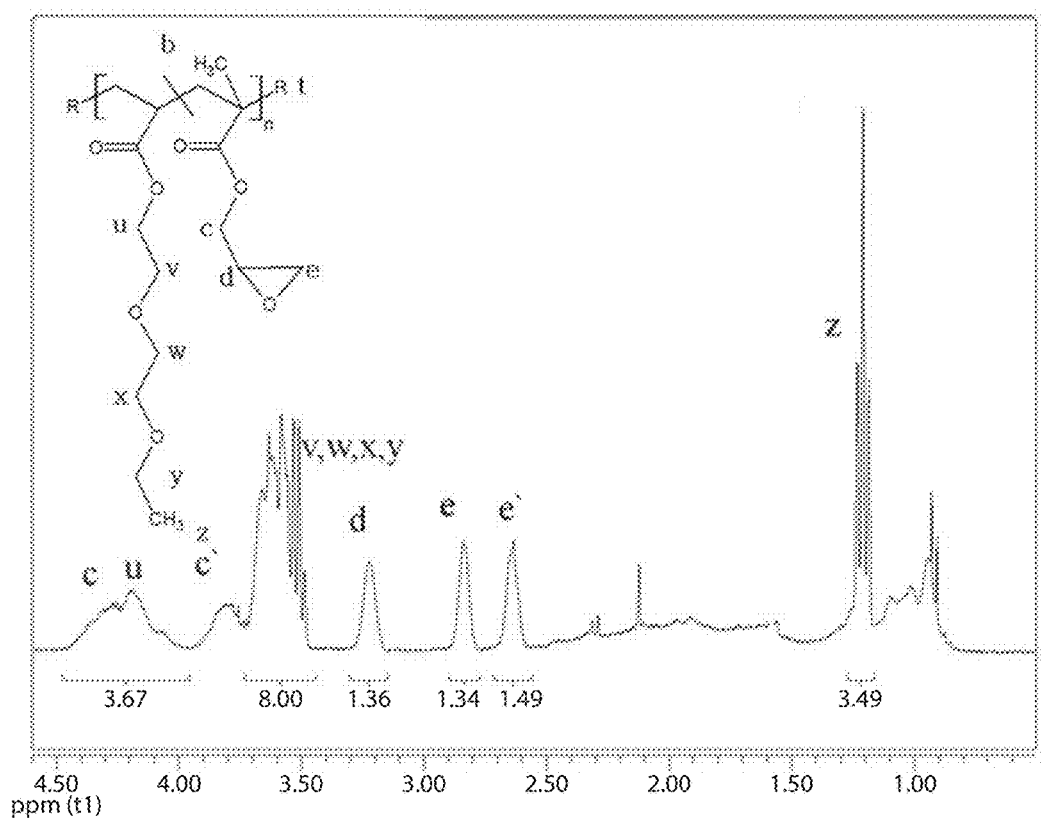
FIG. 5 includes H NMR spectra of P(E2ES-co-57GMA) according to an example.

The epoxy functionality of S 285 was determined as follows. The H NMR spectra of the copolymer synthesized along with the assignments of the various protons is shown in FIG. 5. The measured epoxy content is in excellent agreement with the targeted value of 57 mol %.

Figure 6:
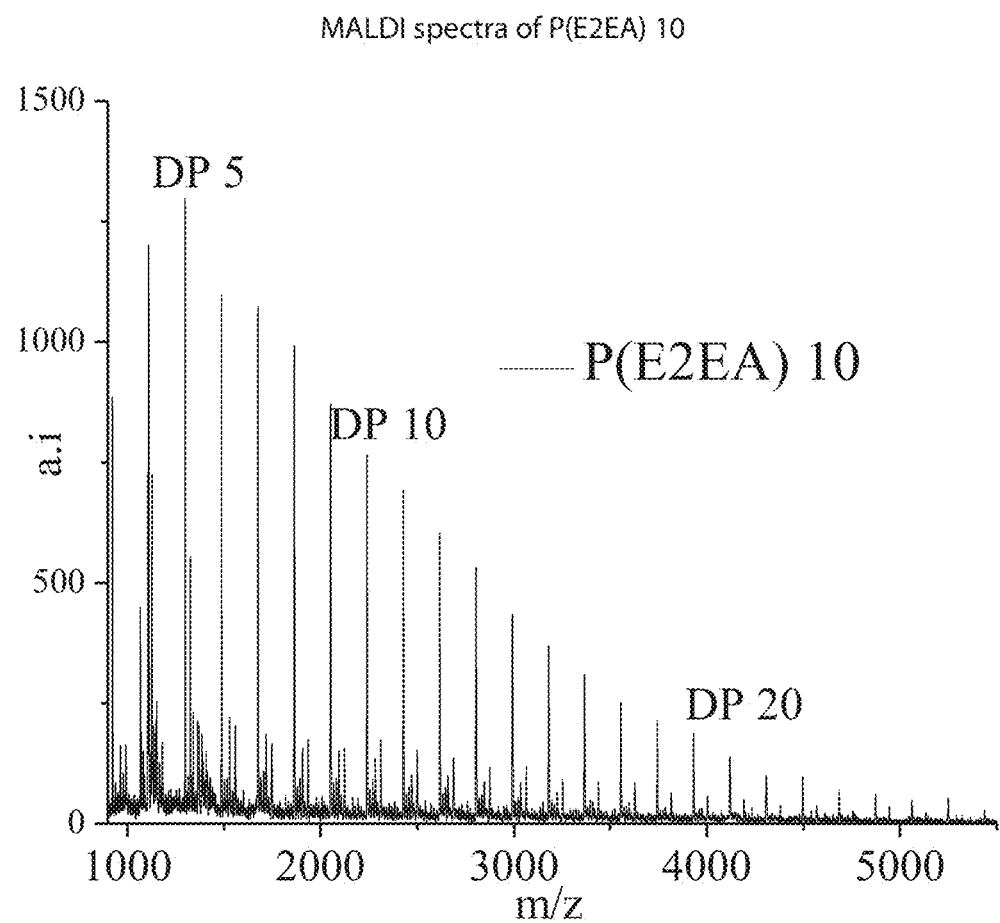
FIG. 6 includes MALDI spectra of P(E2EA) 10 according to an example.
Figure 7:
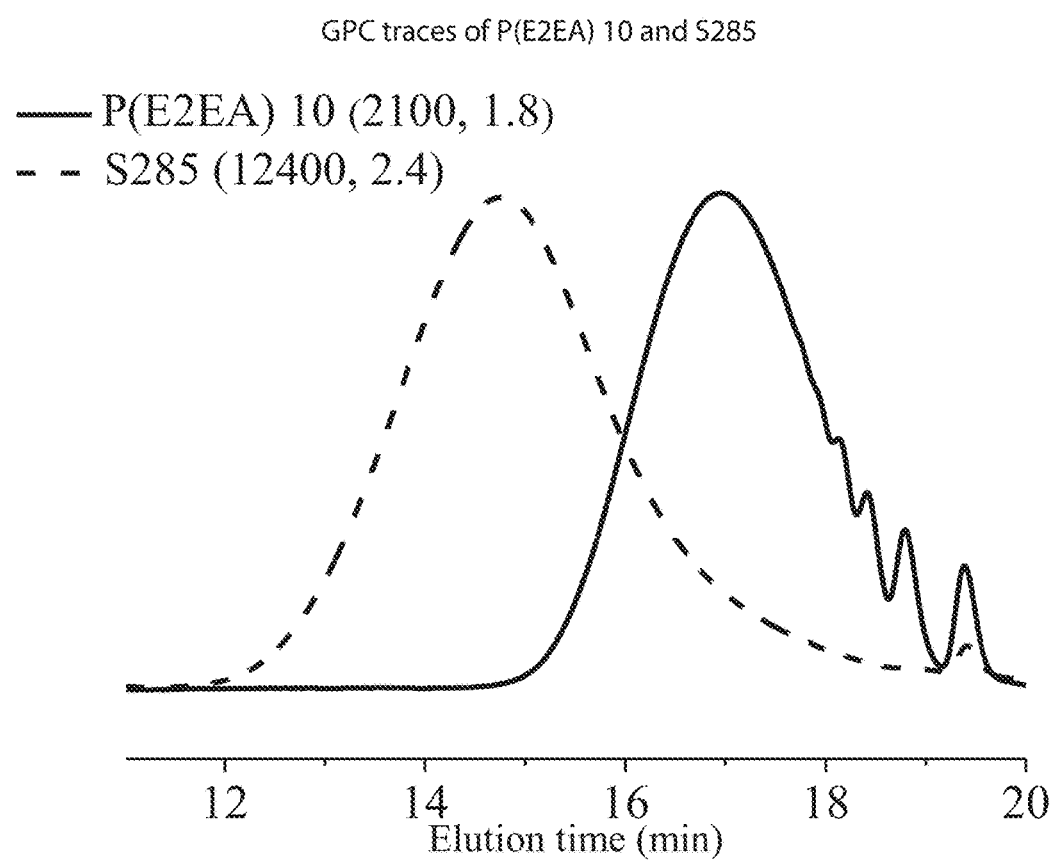
FIG. 7 includes GPC traces of P(E2EA) 10 and S285.

The DP was determined by a combination of MALDI and GPC. MALDI data was obtained on the low molecular weight homopolymer of 2-(2-ethoxyethoxy ethyl) acrylate (PE2EA 10) and is shown in FIG. 6. The DP range for this oligomer is ~5-20. The number average molecular weight with respect to PS standards of P(E2EA) 10 and S285 as determined from GPC (illustrated in FIG. 7) are 2100 and 12400 g/mol respectively. The molecular weight of 5285 is ~5-6 times that of P(E2EA). Hence the DP of 5285 can be estimated to be well above 25 units and thus the functionality will be greater than 0.57*25~14-15 units, well above the functionality of CE215.

A summary of the results of the functionality determination for the reactive oligomer is provided below in TABLE 4.

TABLE 4

List of varying functionality reactive oligomers studied

| Reactive oligomer | Nomenclature | EEW (g/eq) | GMA (mol %) | DP | Functionality | Tg (° C.) |
|---|---|---|---|---|---|---|
| Joncryl 4385 | CE 450 | 450 | 29 | 3-15 | 1-4 | −38 |
| Joncryl 4368 | CE285 | 285 | 44 | 4-16 | 2-7 | 54 |
| Pluss optiPET | CE 215 | 215 | 61 | 8-20 | 5-12 | 49 |
| P(E2EA-co-57GMA) 115 | S 285 | 285 | 57 | >25 | >15 | −22 |

Example 2

Acid Value

Figure 8:
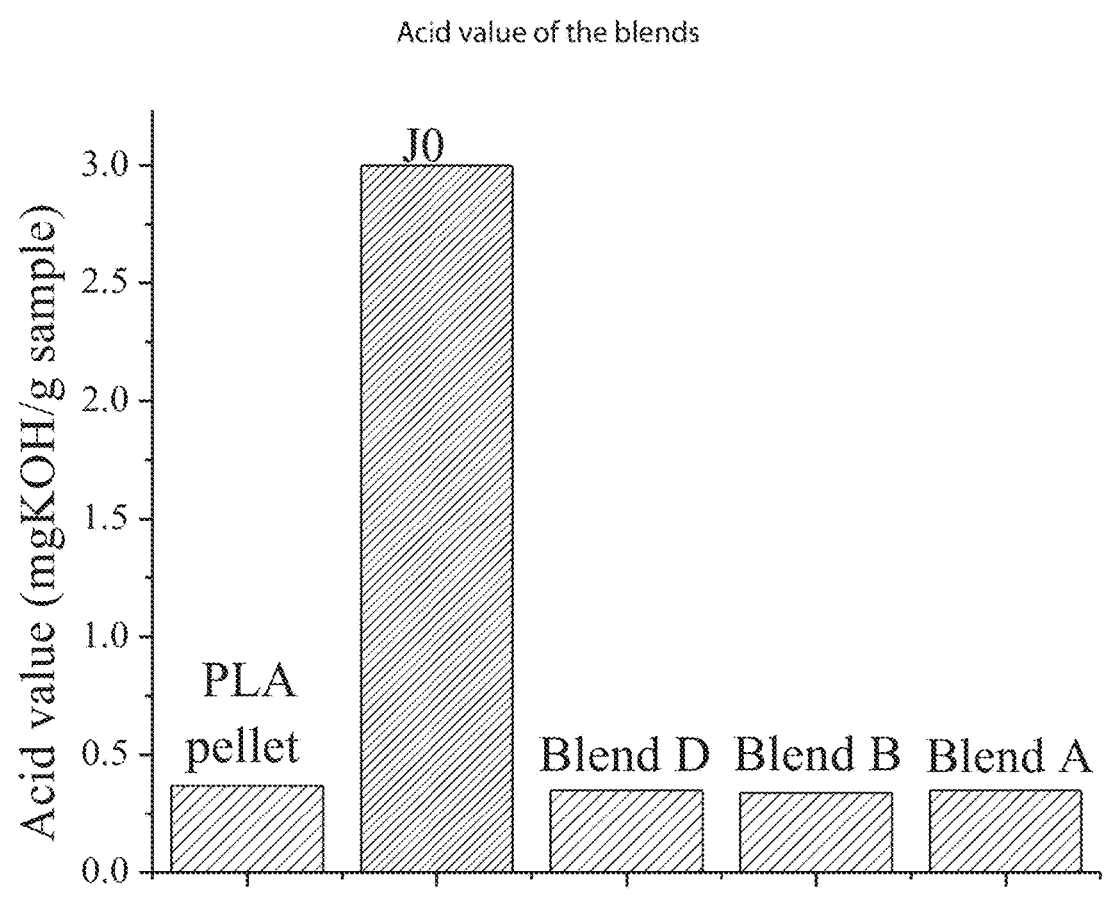
FIG. 8 includes a graphical representation of acid value measurements according to an example.

The acid value of each blend sample was measure for the blend's acid value and compared against samples lacking the epoxy functional plasticizer and PLA. The measurement of acid value is well known in the art. The results are illustrated in FIG. 8. The acid value measurements indicate that degradation occurs during processing of the blend without reactive plasticizer, leading to an increased concentration of carboxylic acid groups. When the blend is processed with the reactive oligomer, an excess of epoxy groups are supplied and the resulting acid values are very low indicating that the acid groups generated during degradation are all consumed by the epoxy groups.

Example 3

Molecular Weight

Figure 9:
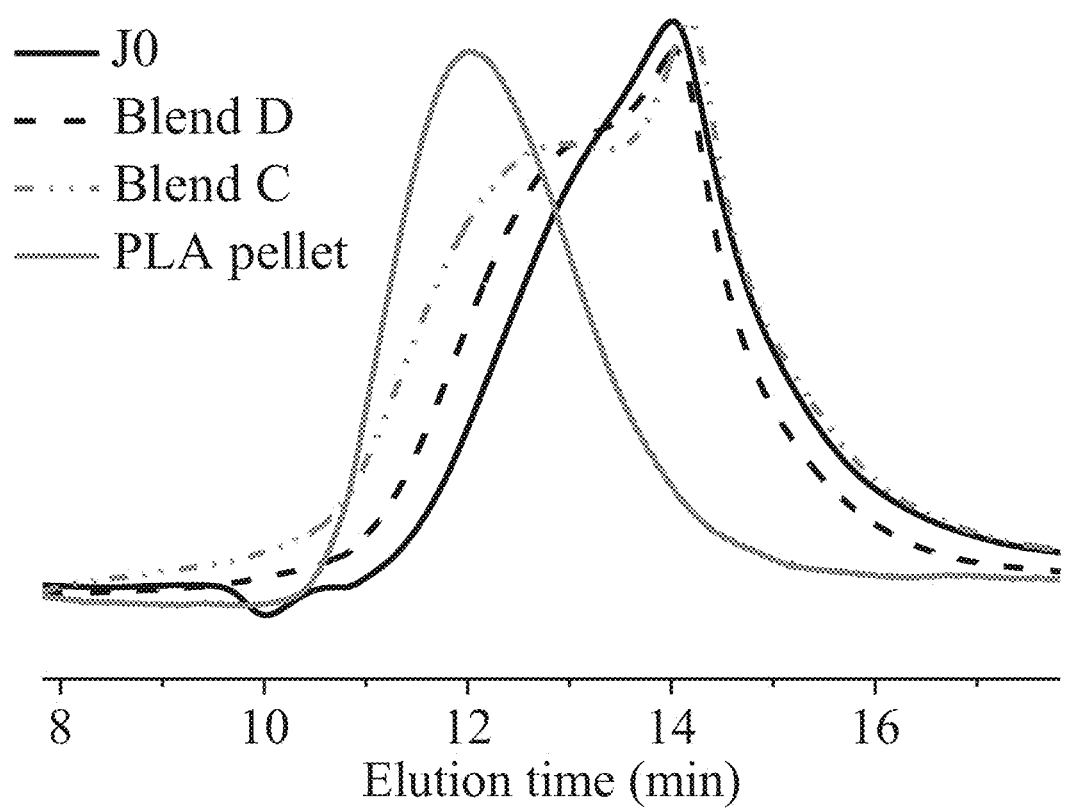
FIG. 9 includes GPC traces of compositions according to an example.
Figure 10:
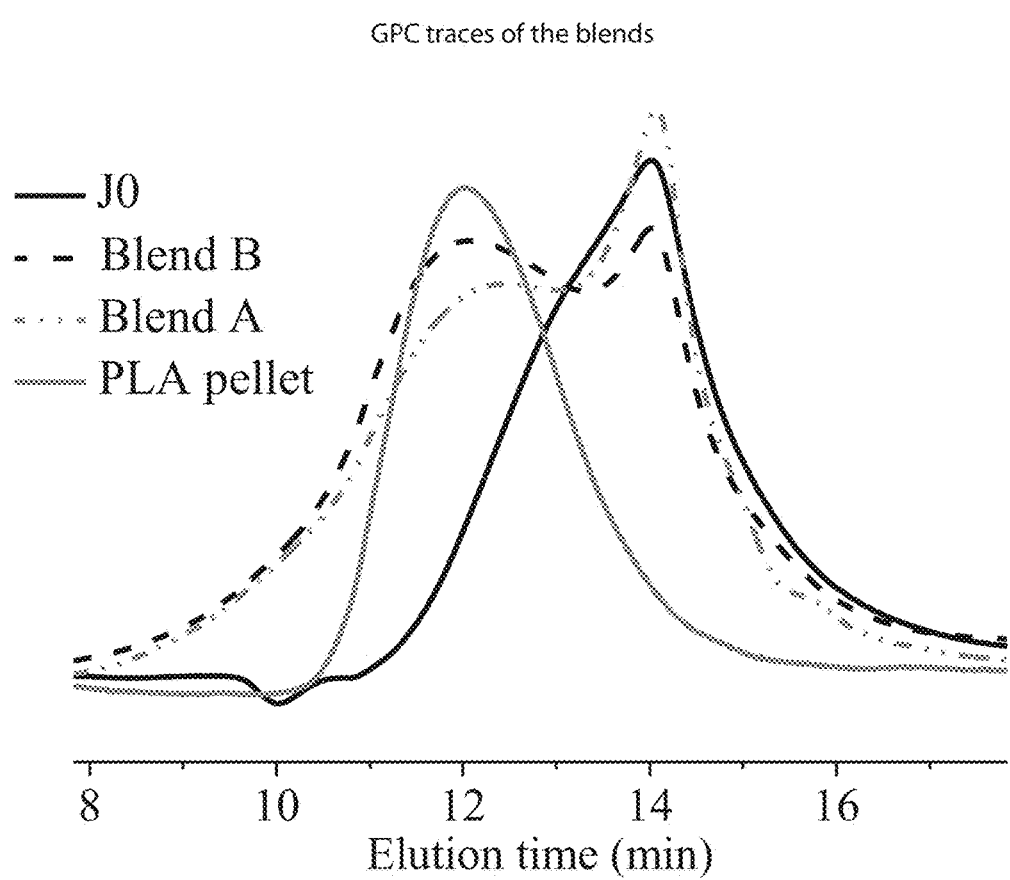
FIG. 10 includes GPC traces of compositions according to an example.

The blends were then measured to determine the molecular weight of the PLLA, and particularly, the change in molecular weight during processing. To determine the molecular weight change, the GPC traces of the blends were measured and are illustrated in FIGS. 9-10. The molecular weight and dispersity measurements are provided in Table 5 below.

TABLE 5

Molecular weight and dispersity measured using GPC

| Blend | $M_n$ (g/mol)* | Đ |
|---|---|---|
| J0 | 30000 | 2.55 |
| A | 53000 | 6.4 |
| B | 59000 | 5.8 |
| C | 45000 | 3.3 |
| D | 39000 | 2.9 |
| PLA Pellet | 120000 | 1.67 |

As seen from the GPC traces, there is a large drop in the molecular weight of PLLA during processing of the PLA/triblock/plasticizer blend (J0 vs PLA pellet). When reactive oligomers are added to the blend during processing, depending on the functionality of the oligomers, a lower drop in molecular weight or increase in molecular weight can occur as illustrated in Table 5 above. It should be noted that experiments with 1 wt % of the reactive oligomers were performed and no increase in molecular weight was observed. In addition beyond a concentration of 3 wt % a plateau in molecular weight increase was reached. Without wishing to be bound by theory, it is believed that the results indicate that a concentration in excess of 1 wt % aides in the ability for the chain extension reaction to be faster than the degradation reaction. As the functionality of the reactive oligomer increases, the molecular weight of the PLLA increases. In blend D and C where low and medium functionality oligomers are used, the increase in molecular weight is modest. When high functionality oligomer is used (Blend B) a large increase in the molecular weight occurs. Without wishing to be bound by theory, it is believed that this increase in molecular weight with increase in functionality indicates that the main reaction taking place is between the carboxylic acid and epoxy groups resulting in grafting of the degraded PLLA chains to the reactive oligomer.

However a plateau in molecular weight increase is reached beyond this functionality range. When very high functionality oligomer is used (Blend A) the molecular weight increase is similar to that in Blend B. Without wishing to be bound by theory, it is believed that these results indicate that beyond a functionality of 5-11, further functionality increase may not lead to additional grafting of PLA chains to the epoxy groups. This may be attributed to the increased steric hindrance for the reaction of epoxy groups with the degraded PLLA chains once a certain number of chains have been grafted to the epoxy groups and the reduction in number of accessible epoxy groups with increase in molecular weight of the reactive oligomers because of the random coil conformation of the chains.

In addition the results indicate that the molecular weight of the triblock copolymer remains unaffected. Without wishing to be bound by theory, these results may be explained by kinetic and statistical reasons. As the PDLA block in the triblock copolymer is terminated in hydroxyl groups, their reactivity with epoxy groups is negligible at the temperature and time used. In addition as PDLA is only ~10 wt % of the blend, statistically their reaction with epoxy groups is less likely.

Example 4

Melt Force

Figure 11:
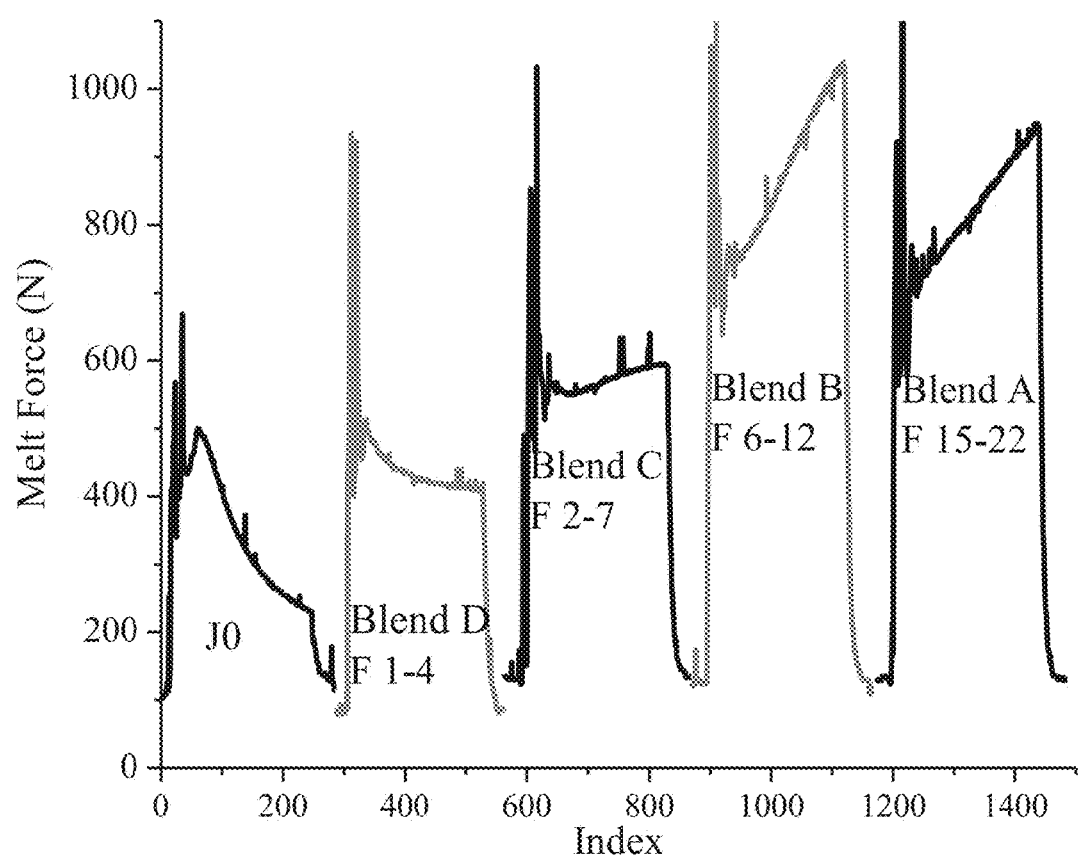
FIG. 11 includes melt force data for compositions according to an example.

The samples were also tested for melt force data as described above with a blending time of about 7 minutes. The results are illustrated in FIG. 11. It should be noted that the melt force measured depends on the amount of material in the mini extruder chamber. As the amount of material can vary slightly between different runs, the absolute value of force will vary. Hence, the absolute force measured is not a normalized measurement and should not be compared. The increase or decrease of force with blending time is the data which can be compared and studied.

As indicated in FIG. 11, the melt force data is also consistent with the molecular weight measurements from GPC. Without wishing to be bound by theory, it is believed that a large drop in melt force occurring in the absence of the reactive oligomers may indicate a large drop in molecular weight due to degradation taking place. As shown in FIG. 11, it was discovered that with increasing functionality of the reactive epoxy functional oligomers, the melt force drop is reduced, and the increase in melt force occurs in higher functionality epoxy oligomer blends, indicating molecular weight increase is taking place.

Completely surprisingly and unexpectedly, it was found that no gelation (network formation) occurred despite the high functionalities and concentration of the reactive oligomers used, as all the samples were completely soluble in chloroform. Gelation did not occur even in blends containing 5 wt % of CE215. Studies on chain extension of PET using reactive oligomers have shown that micro-gel formation occurred when >1.5 wt % of reactive oligomers were used. Without wishing to be bound by theory, and described in more detail above and in reference to FIGS. 1 and 2, it is believed that as PLA is a hydroxy-acid based polyester, which upon hydrolysis, PLA chains necessarily have one carboxylic acid end-group and the other end-group is an hydroxyl group. In other common polyesters like PET which are made using di-acids and di-ols, the degradation pathways can lead to chains being either both ends with acid groups, both ends with hydroxyl groups or one end with acid and other end with hydroxyl groups.

Hence the degraded PLA chains have a "reactive functionality" of one as the carboxylic acid groups are present at only one chain end and the hydroxyl groups at the other chain end have negligible reactivity with the epoxy group at processing temperatures. Accordingly, even when high functionality epoxy oligomers are used at high concentrations, no gelation occurs under these conditions. In fact, using high functionality epoxy oligomers leads to a larger increase in molecular weight as more PLA chains are grafted per molecule of the reactive oligomer and hence a beneficial increase in the hydrolytic stability, physical and rheological properties of the material can be achieved.

Example 5

Effect on Co-crystallization between PLLA and Triblock Copolymer

Figure 12:
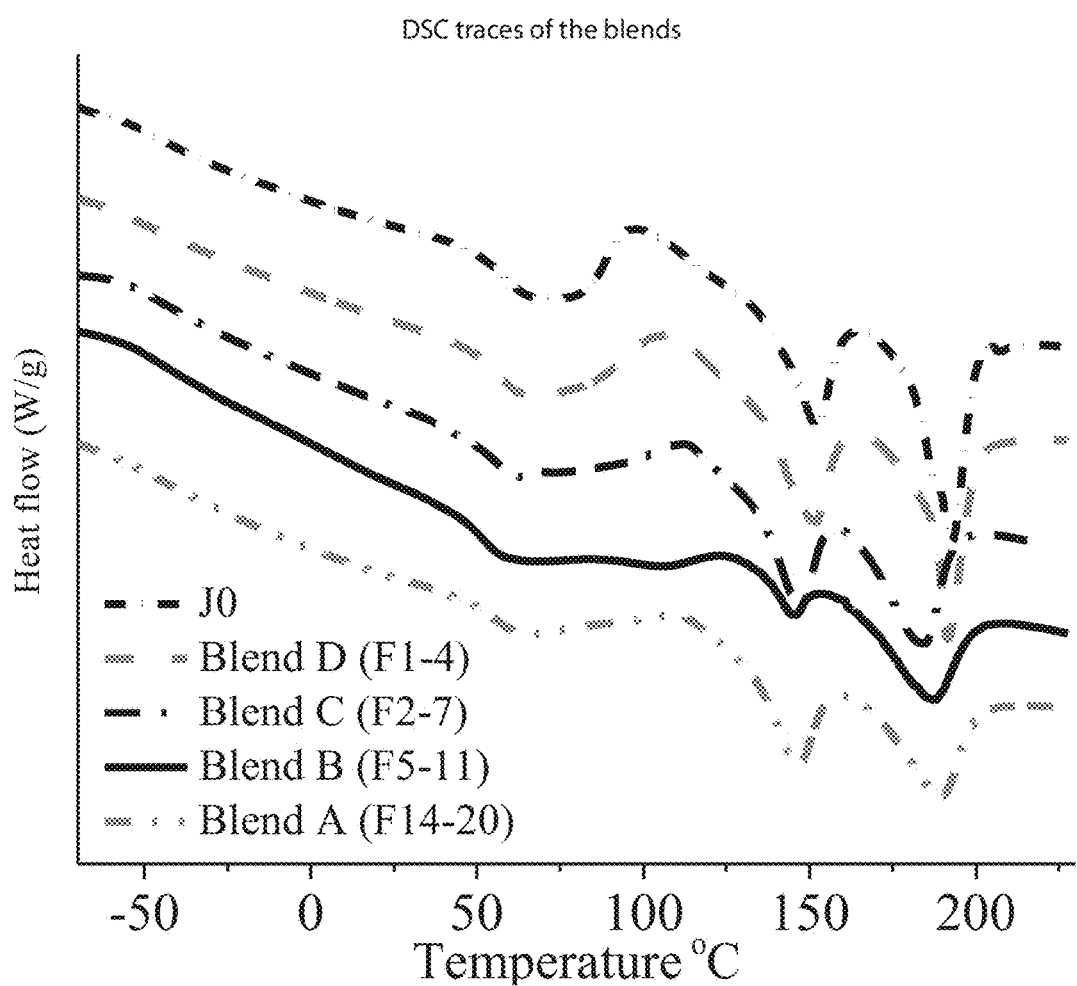
FIG. 12 includes DSC traces for compositions according to an example.

Because of the multifunctional nature of the reactive oligomers used, the molecular weight increase is a result of grafting of the PLLA chains on the reactive oligomers. Hence the resultant structures would be highly branched and the co-crystallization with the triblock copolymer was expected to be negatively affected. However, completely surprisingly, and as illustrated in FIG. 12, the stereocomplex melting endotherm is observed in all the blends. Thus, despite the presence of branched structures, stereocomplex formation between the triblock copolymer and PLLA is not prevented.

TABLE 6

DSC Traces of the blends

| Sample | ΔH stereocomplex (J/g) | Stereocomplex crystallinity (%) | % triblock participating |
|---|---|---|---|
| Jo | 16 | 11 | 59 |
| D | 14 | 10 | 51 |
| C | 11 | 8 | 40 |
| B | 10 | 7 | 37 |
| A | 11 | 8 | 40 |

Example 6

Modulus and Elongation at Break

Samples J0, A, B, and C were tested and measured for their modulus and elongation at break, and Tg. Measurements were performed as described herein. The results are presented in FIG. 13 and Table 7 below.

TABLE 7

Mechanical Properties

| Sample | Modulus (MPa) | $\varepsilon_b$ (%) | $T_g$ (oligomer) |
|---|---|---|---|
| J0 | 90 ± 15 | 230 ± 24 | NA |
| C | 117 ± 15 | 240 ± 12 | 50° C. |
| B | 131 ± 2 | 245 ± 11 | 48° C. |
| A | 121 ± 6 | 244 ± 30 | −22° C. |

Figure 13:
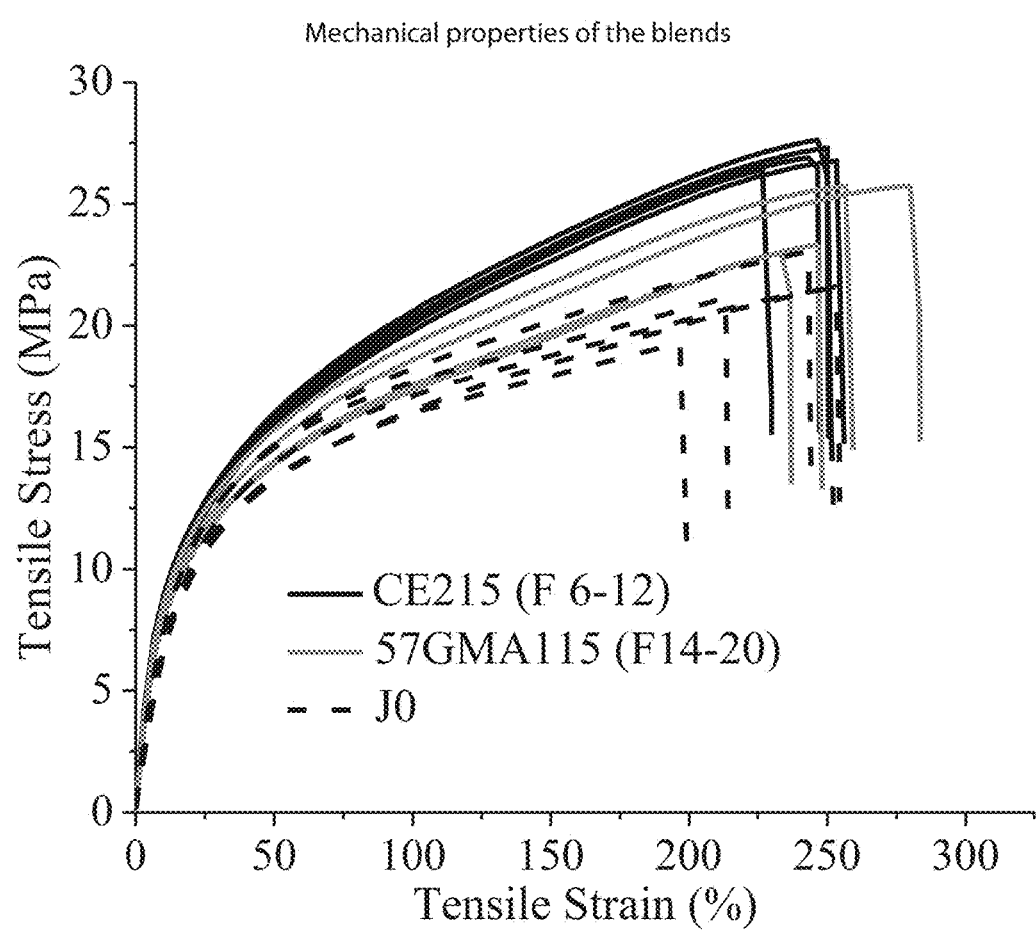
FIG. 13 includes tensile stress measurements according to an example.

As seen from FIG. 13 and Table 7, the use of reactive oligomers retains the low modulus and high elongation at break possessed by the PLA/triblock/Plasticizer blend, a surprising and unexpected effect. Further, there is an increase in the ultimate tensile strength in the high functionality epoxy oligomer blend because of the higher molecular weight of the blend. In addition, the modulus is not affected by the Tg of the reactive oligomer, as the reactive oligomer is used in an amount not large enough to cause a significant change in blend Tg and therefore the blend modulus.

Example 7

Hydrolytic Stability

Figure 14A:
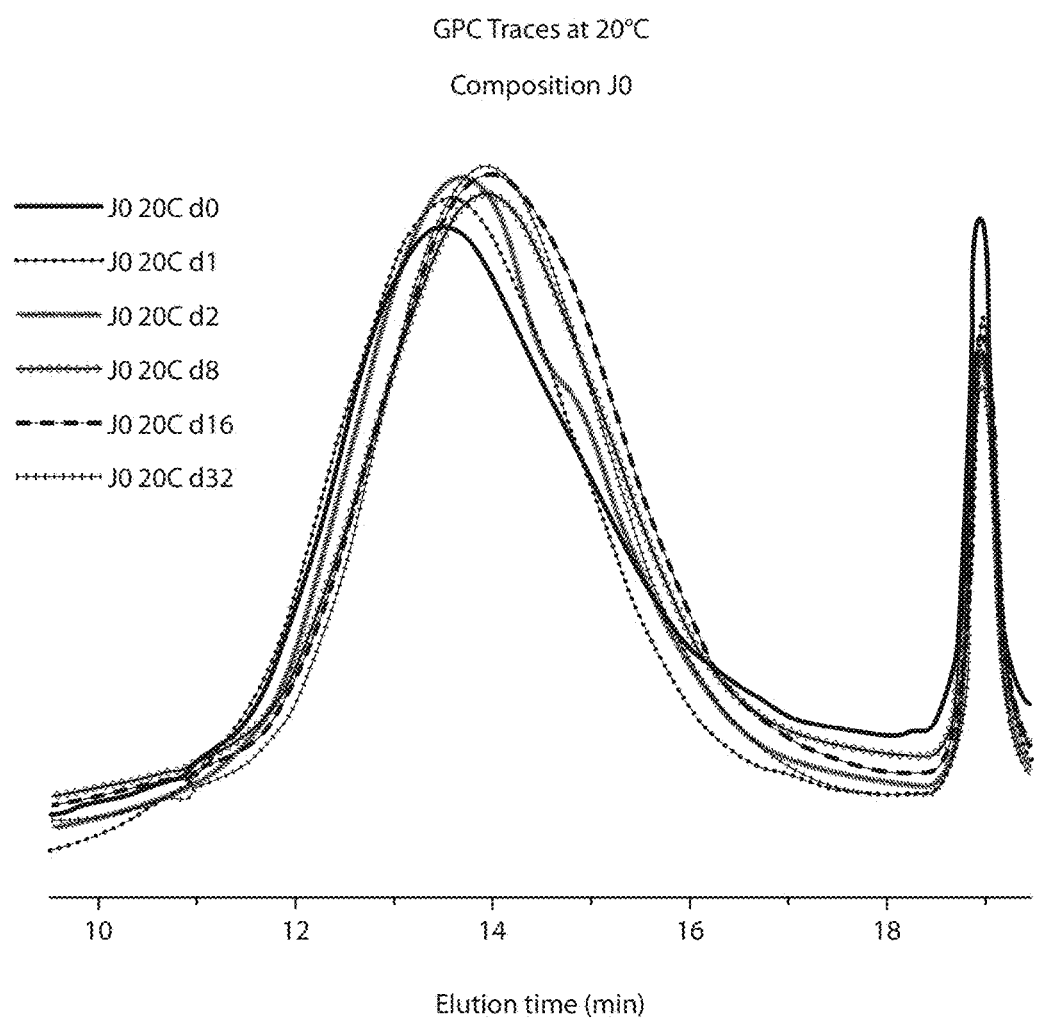
FIG. 14A includes a GPC trace of sample blend J0 after storage at 20 degrees Celsius.
Figure 14B:
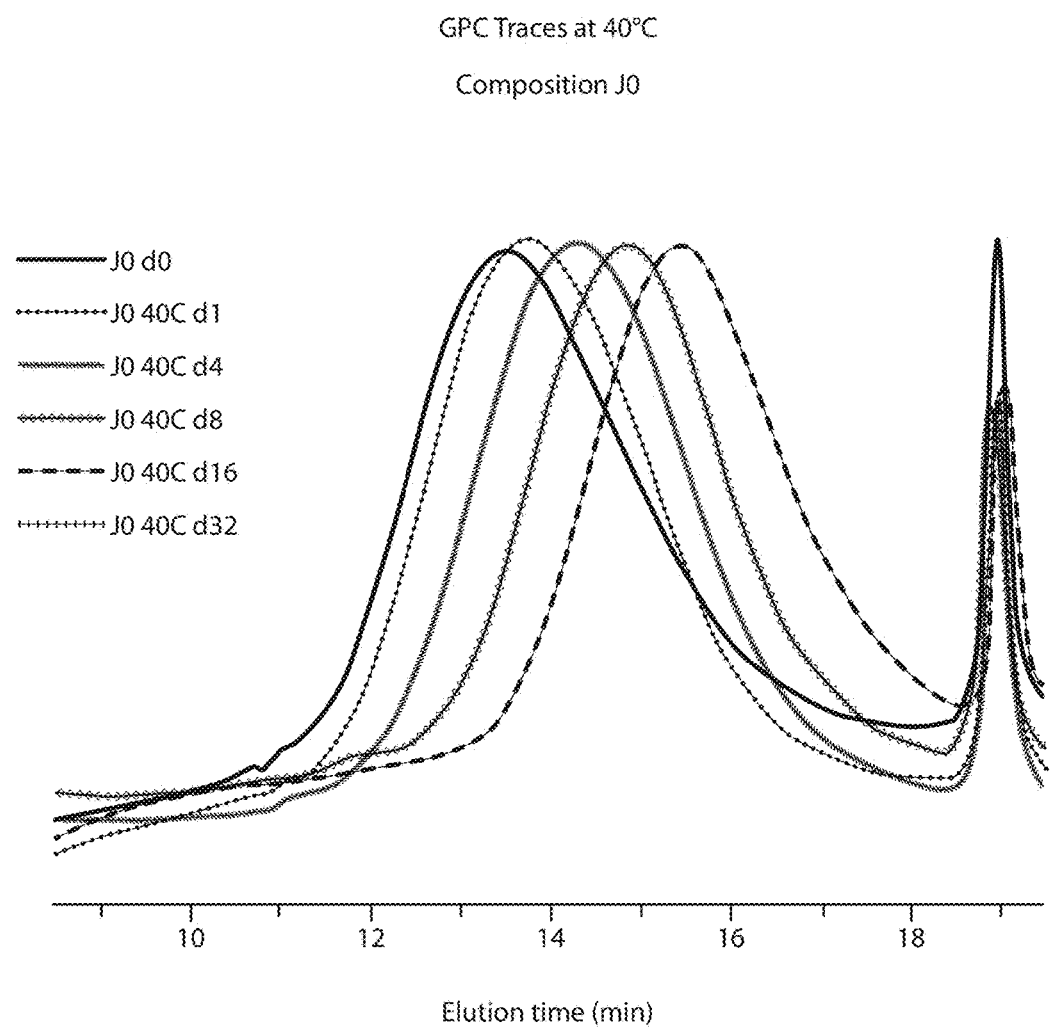
FIG. 14B includes a GPC trace of sample blend J0 after storage at 40 degrees Celsius.
Figure 14C:
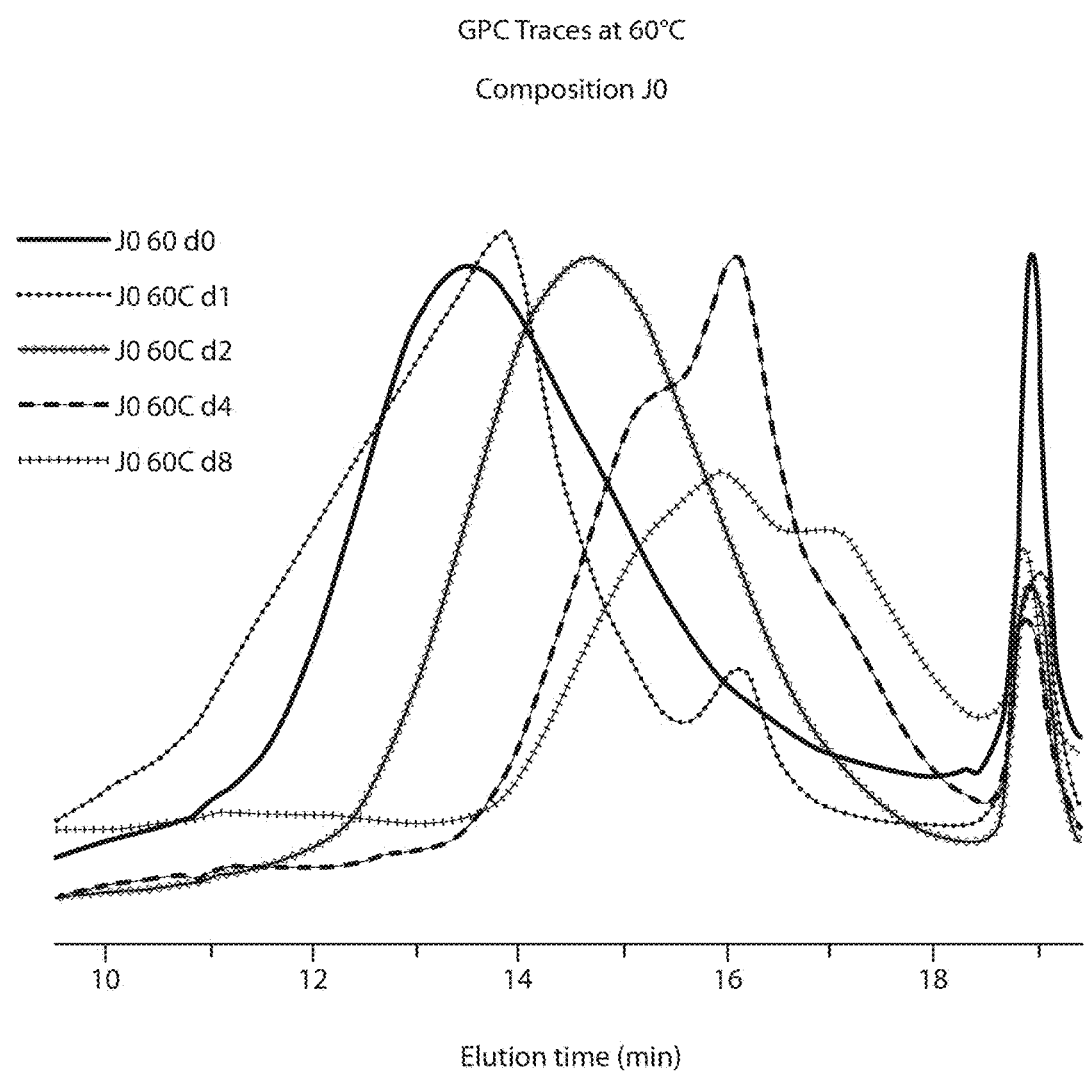
FIG. 14C includes a GPC trace of sample blend J0 after storage at 60 degrees Celsius.
Figure 14D:
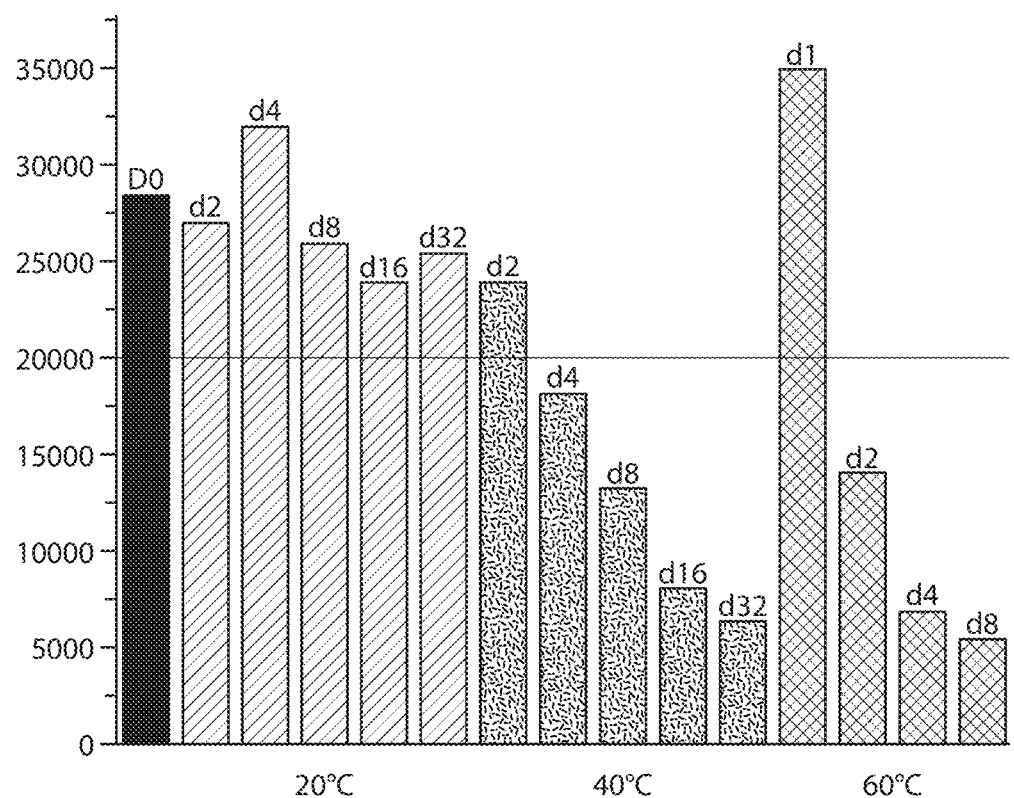
FIG. 14D includes a graph of molecular weight measurements as a function of time and temperature of storage of compositions according to sample blend J0.
Figure 15A:
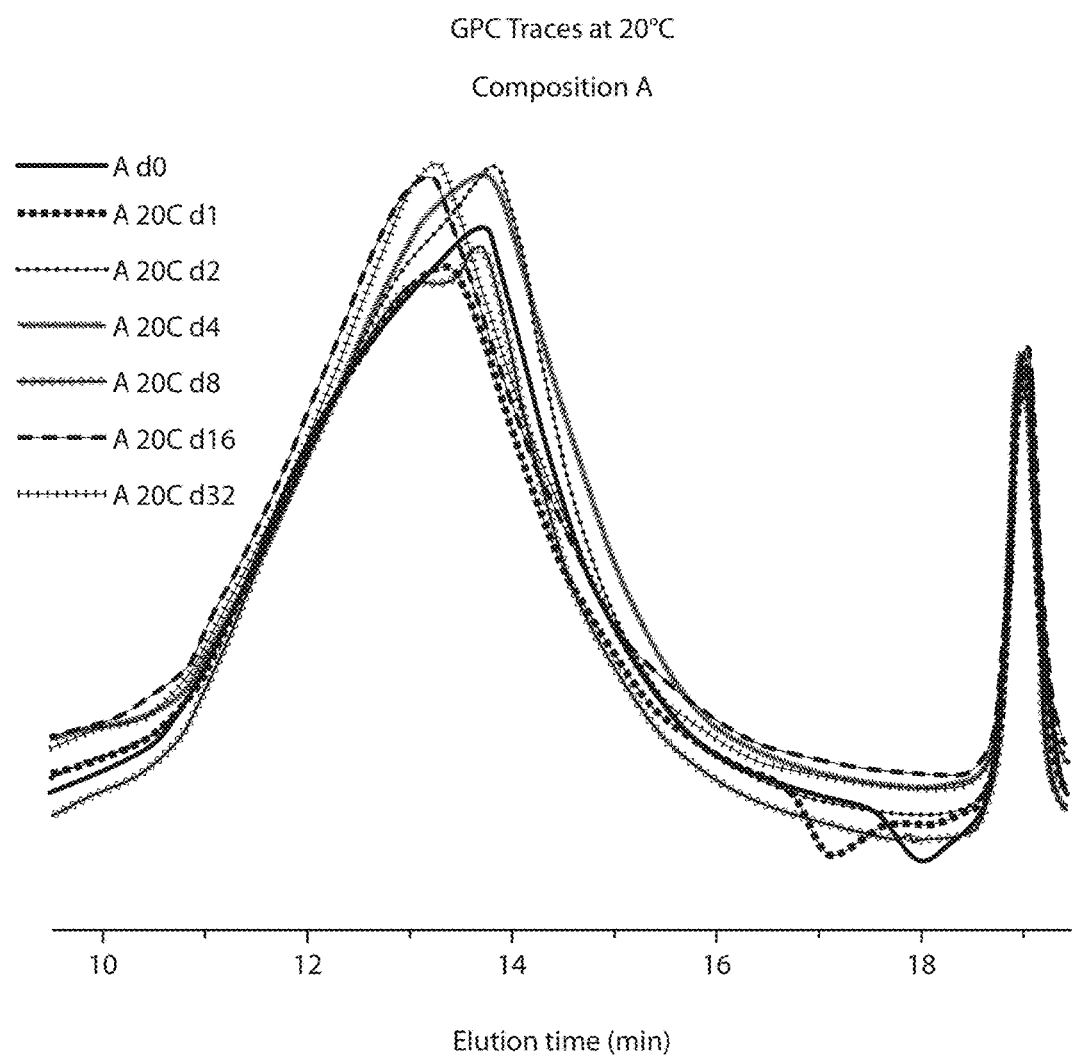
FIG. 15A includes a GPC trace of sample blend A after storage at 20 degrees Celsius.
Figure 15B:
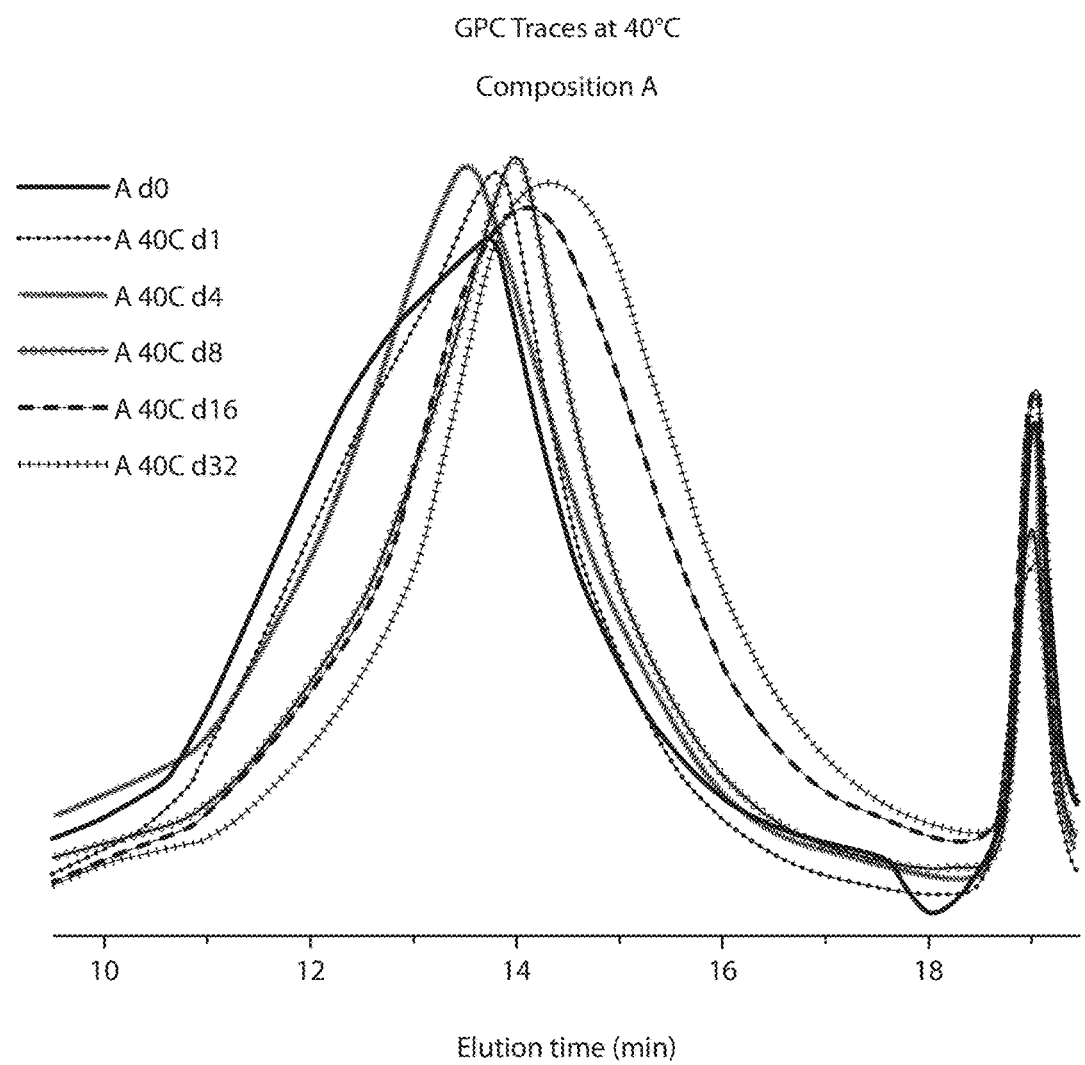
FIG. 15B includes a GPC trace of sample blend A after storage at 40 degrees Celsius.
Figure 15C:
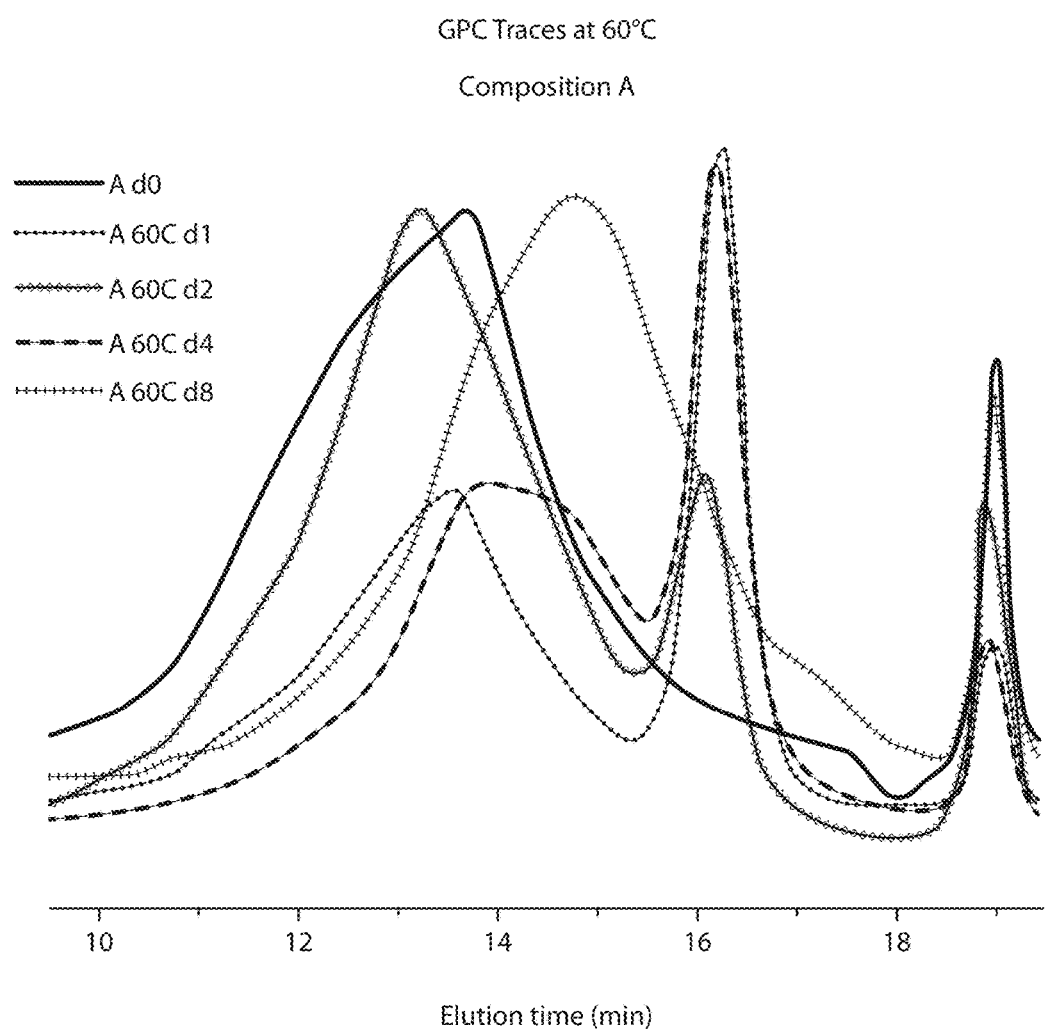
FIG. 15C includes a GPC trace of sample blend A after storage at 60 degrees Celsius.
Figure 15D:
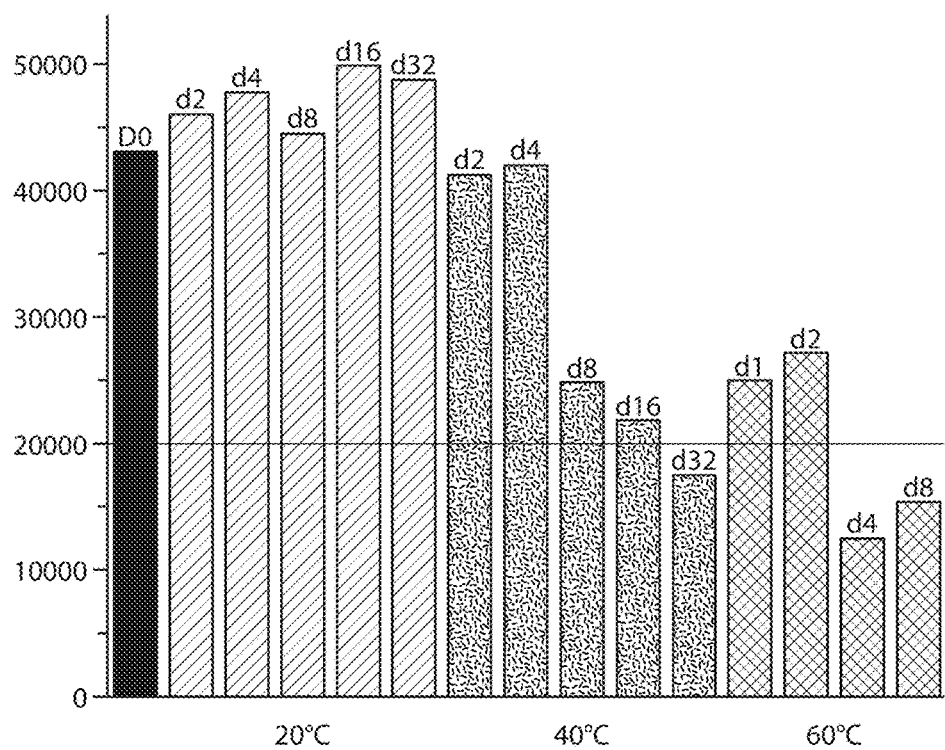
FIG. 15D includes a graph of molecular weight measurements as a function of time and temperature of storage of compositions according to sample blend A.
Figure 16A:
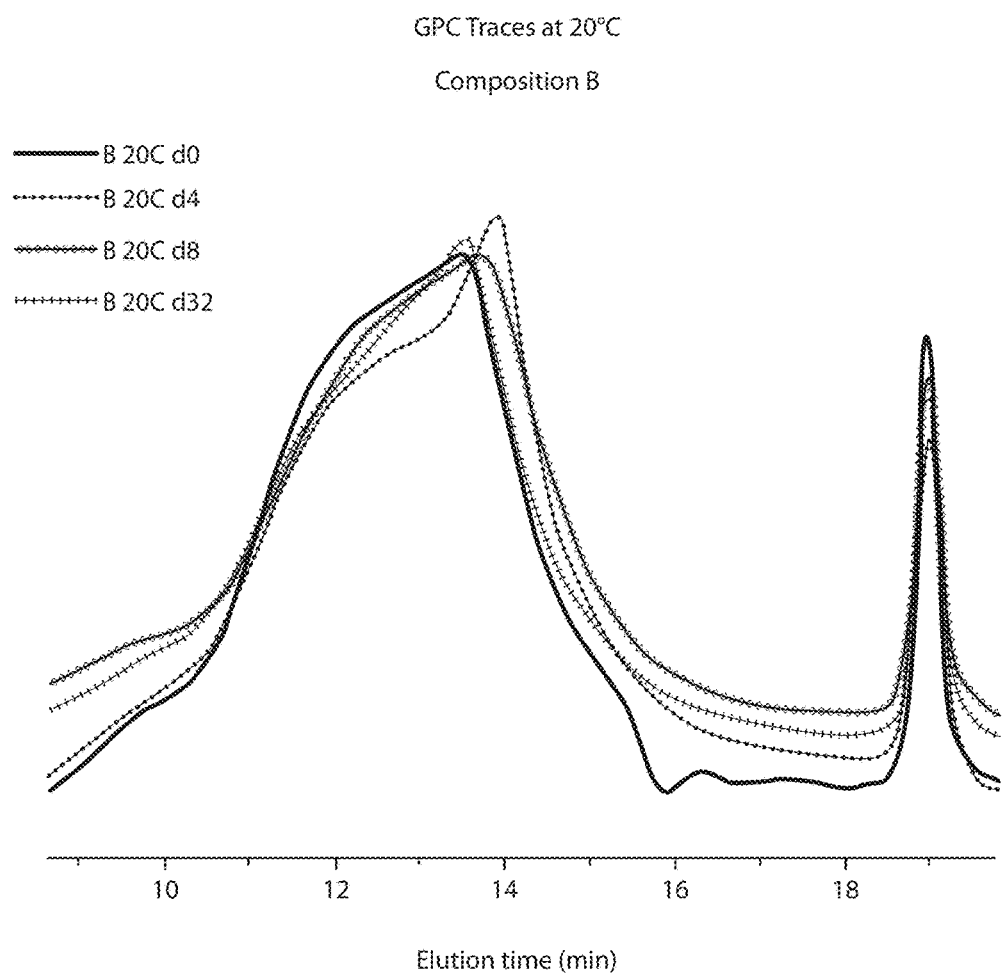
FIG. 16A includes a GPC trace of sample blend B after storage at 20 degrees Celsius.
Figure 16B:
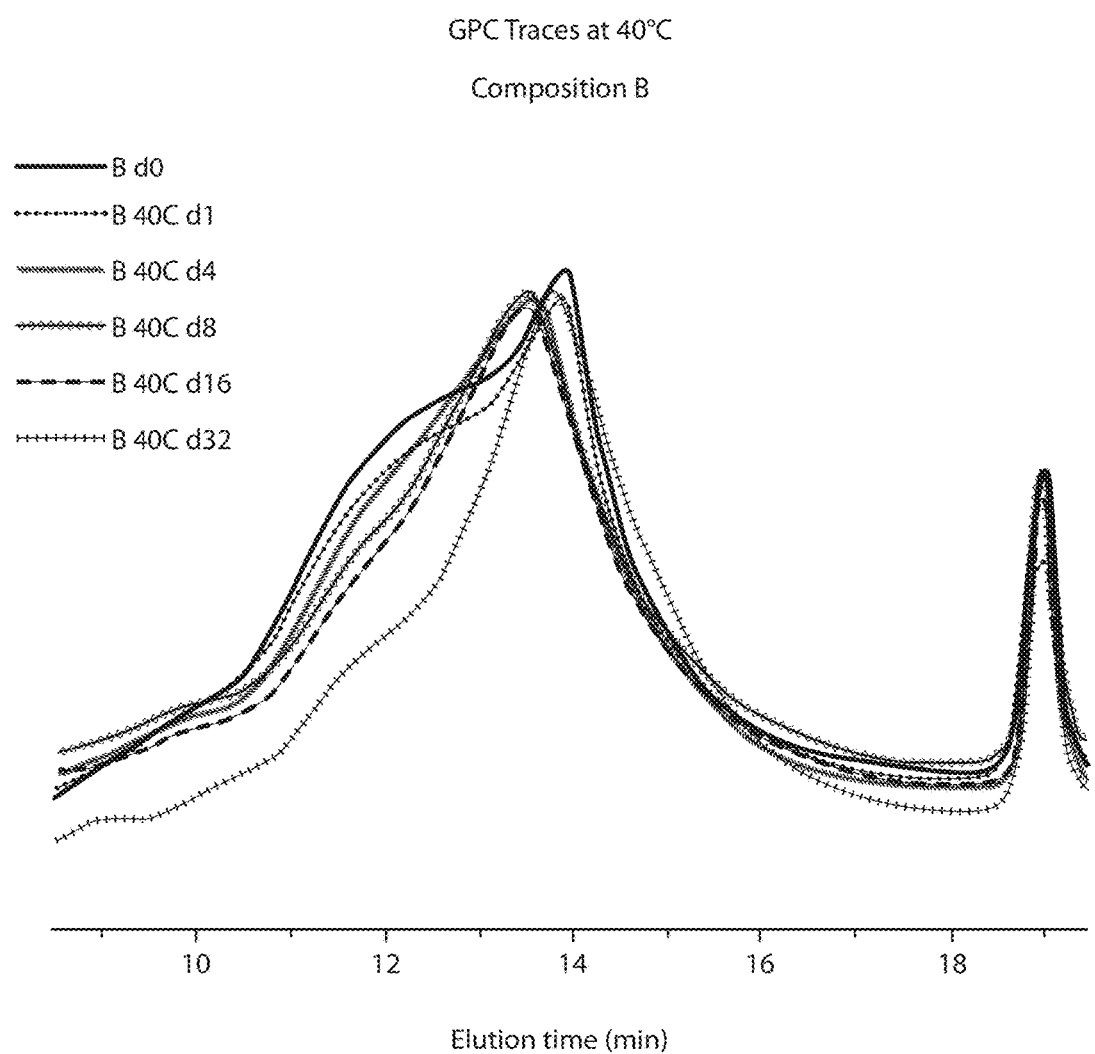
FIG. 16B includes a GPC trace of sample blend B after storage at 40 degrees Celsius.
Figure 16C:
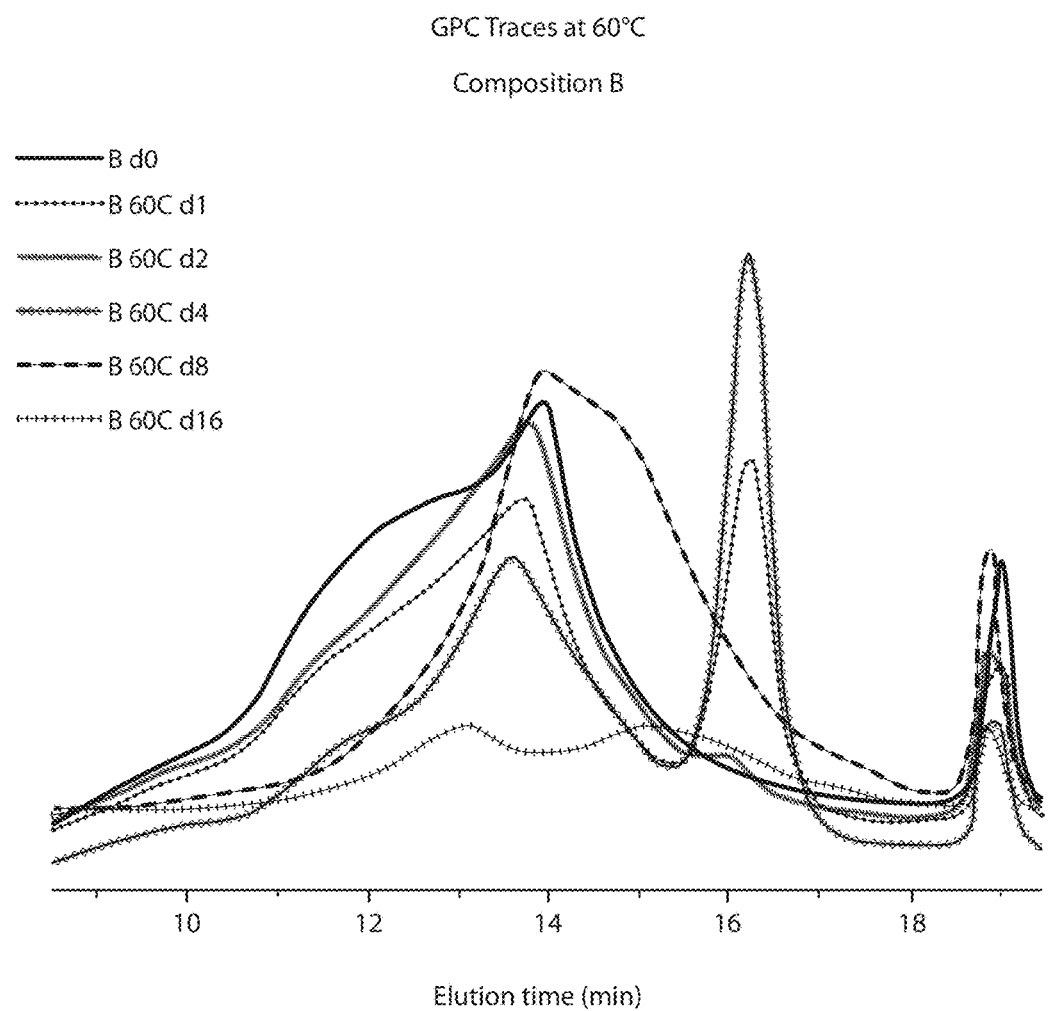
FIG. 16C includes a GPC trace of sample blend B after storage at 60 degrees Celsius.
Figure 16D:
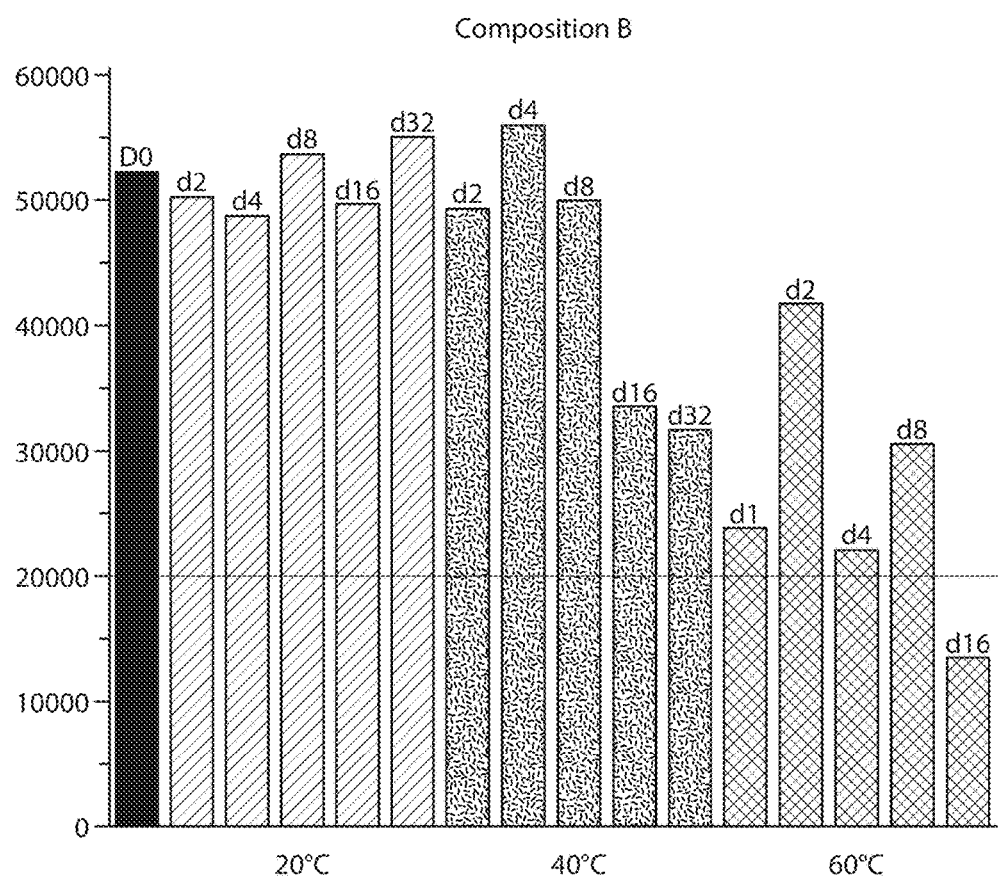
FIG. 16D includes a graph of molecular weight measurements as a function of time and temperature of storage of compositions according to sample blend B.
Figure 17A:
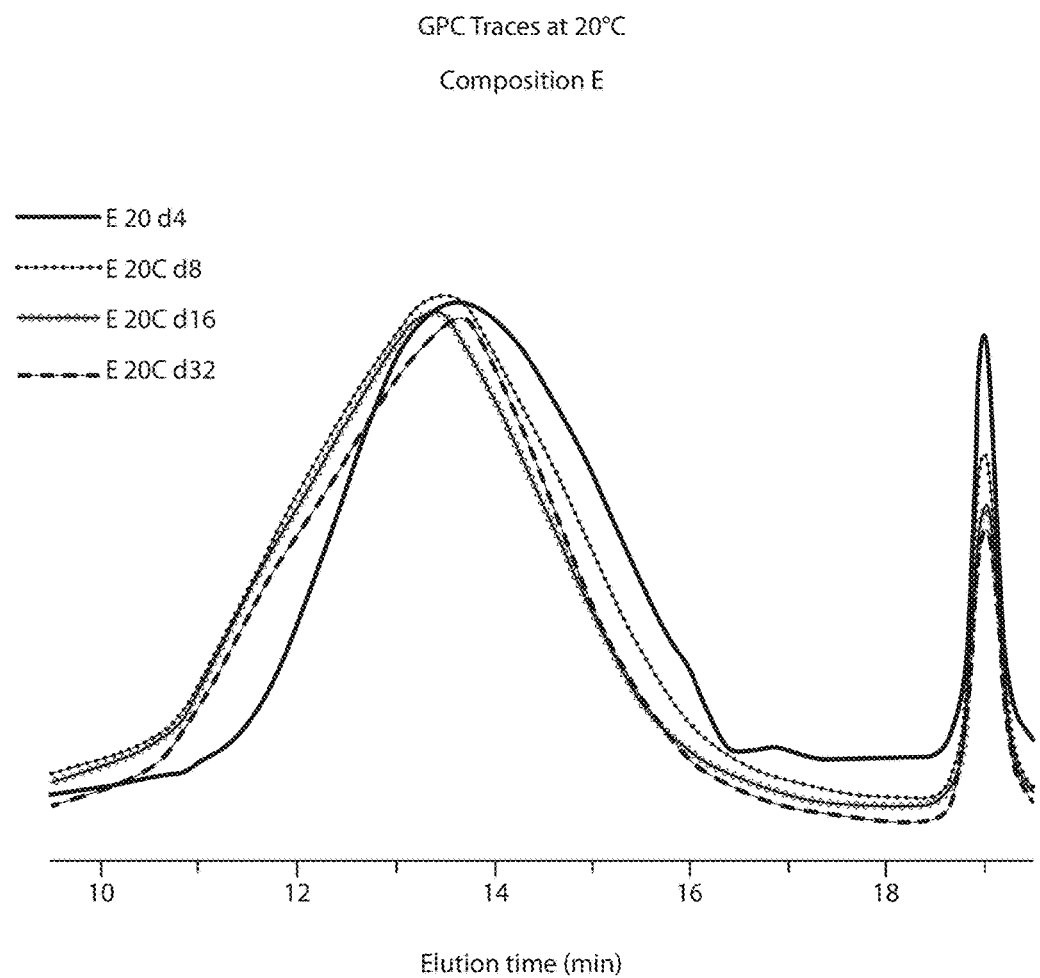
FIG. 17A includes a GPC trace of sample blend E after storage at 20 degrees Celsius.
Figure 17B:
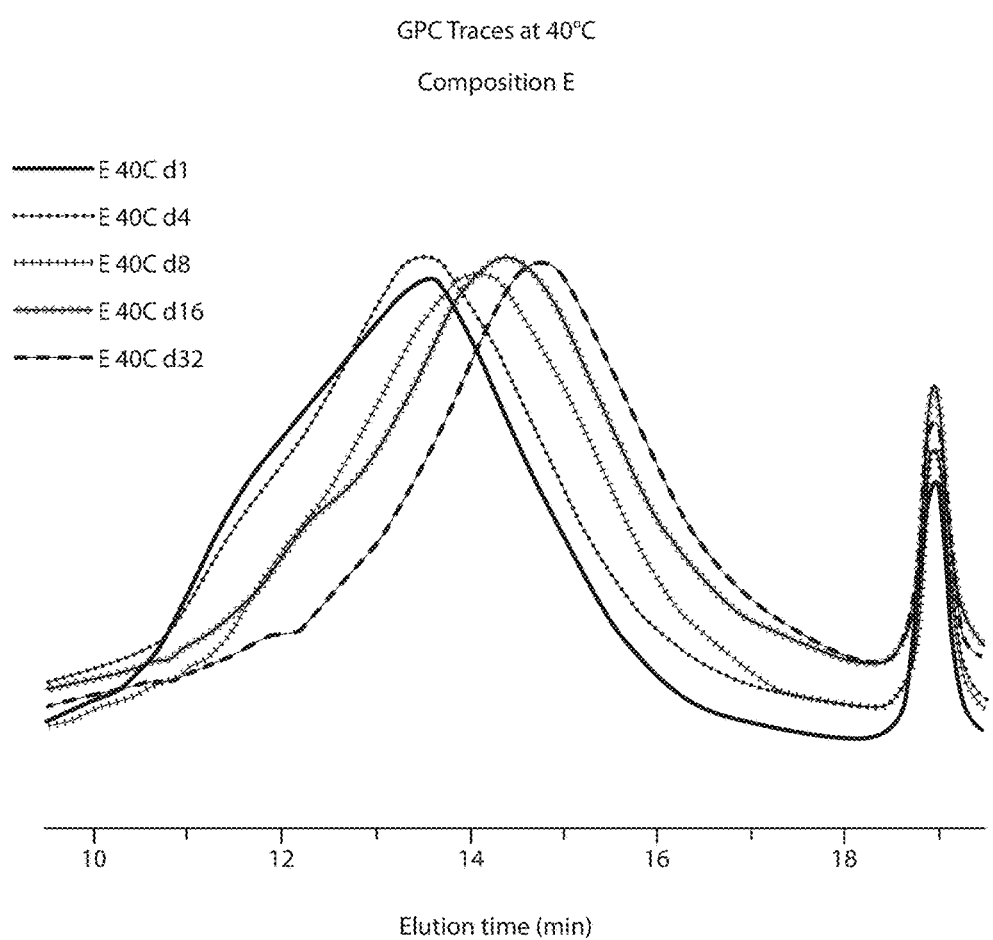
FIG. 17B includes a GPC trace of sample blend E after storage at 40 degrees Celsius.
Figure 17C:
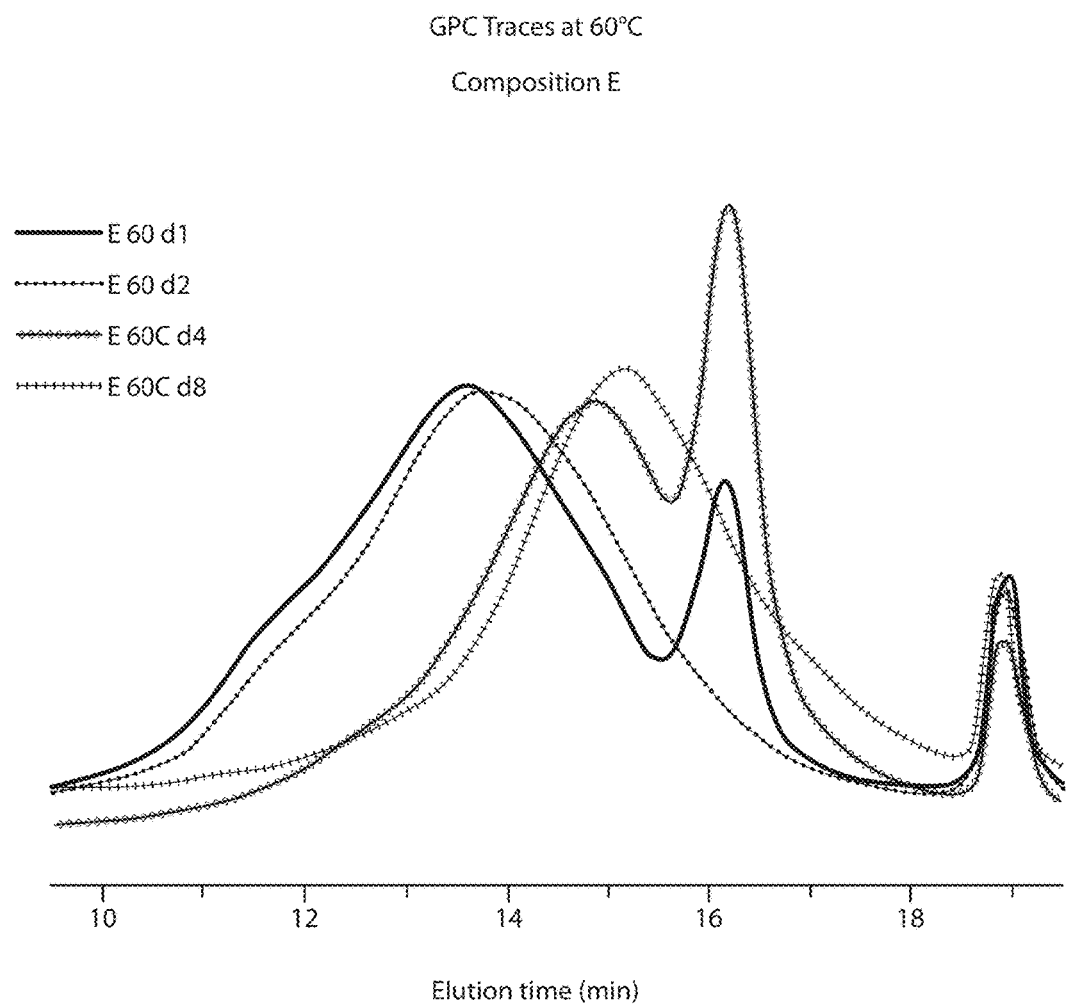
FIG. 17C includes a GPC trace of sample blend E after storage at 60 degrees Celsius.
Figure 17D:
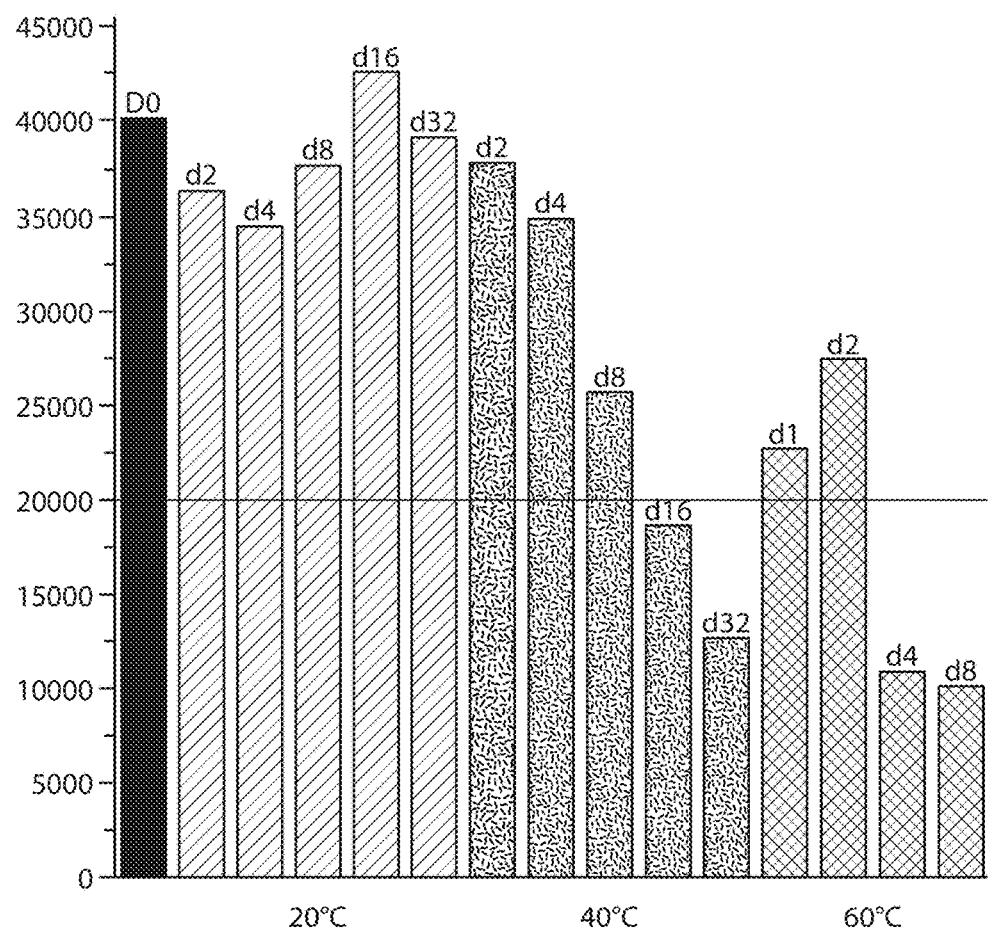
FIG. 17D includes a graph of molecular weight measurements as a function of time and temperature of storage of compositions according to sample blend E.

In order to investigate the hydrolytic stability, blend films were made of the blends J0, A, B, and a further sample E and placed in environmental chambers (Thermotron Industries) maintained at 90% relative humidity at 20° C., 40° C. and 60° C. Blend was synthesized the same as sample blend B. The films were removed from the environmental chambers at regular time intervals (day 2, day 4, etc labeled as d2, d4, etc) and their molecular weights were determined using GPC. The GPC traces of the blends and the molecular weight as a function of time and temperature of the films are shown in FIGS. 14A-17D. In particular, FIG. 14A illustrates the GPC traces of blend J0 at 20° C., FIG. 14B at 40° C., FIG. 14C at 60° C.; and FIG. 14D illustrates the molecular weight as a function of time and temperature for blend J0. FIG. 15A illustrates the GPC traces of blend J0 at 20° C., FIG. 15B at 40° C., FIG. 15C at 60° C.; and FIG. 15D illustrates the molecular weight as a function of time and temperature for blend A. FIG. 16A illustrates the GPC traces of blend J0 at 20° C., FIG. 16B at 40° C., FIG. 16C at 60° C.; and FIG. 16D illustrates the molecular weight as a function of time and temperature for blend B. FIG. 17A illustrates the GPC traces of blend J0 at 20° C., FIG. 17B at 40° C., FIG. 17C at 60° C.; and FIG. 17D illustrates the molecular weight as a function of time and temperature for blend E.

Figure 18:
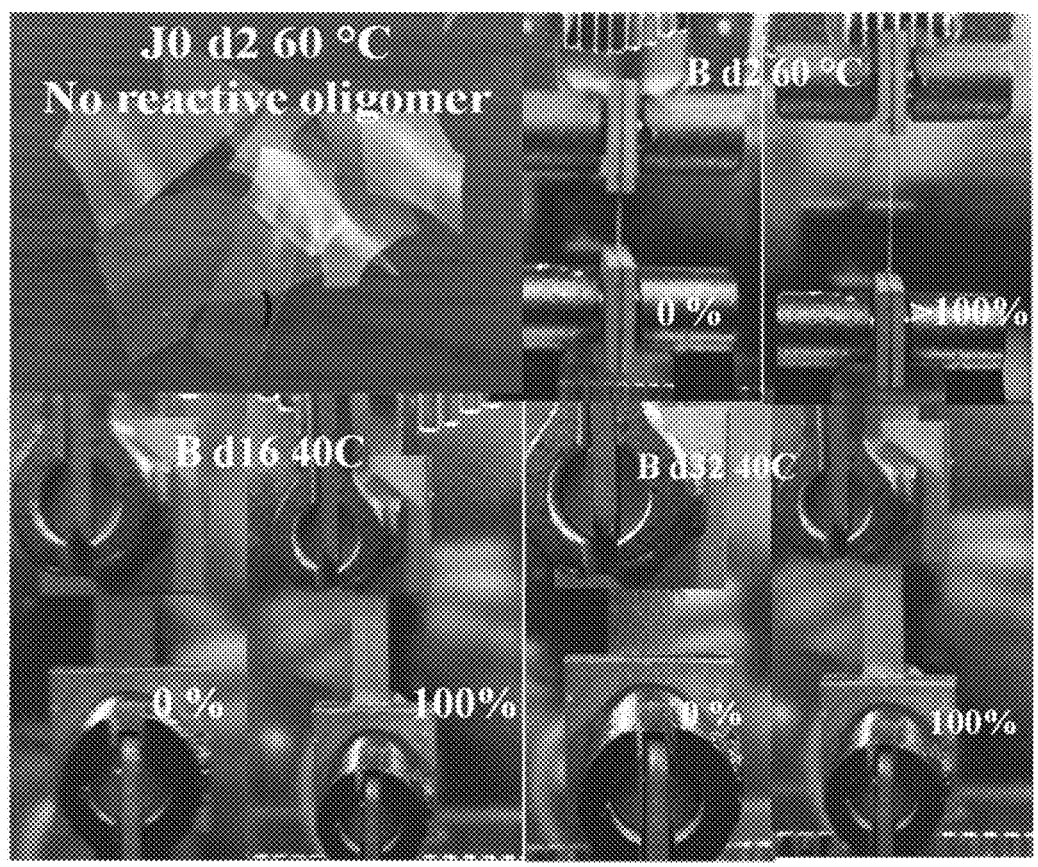
FIG. 18 illustrates a photographical representation of hydrolytic stability of sample blend J0 and sample blend B after various storage times and temperatures.
Figure 19:
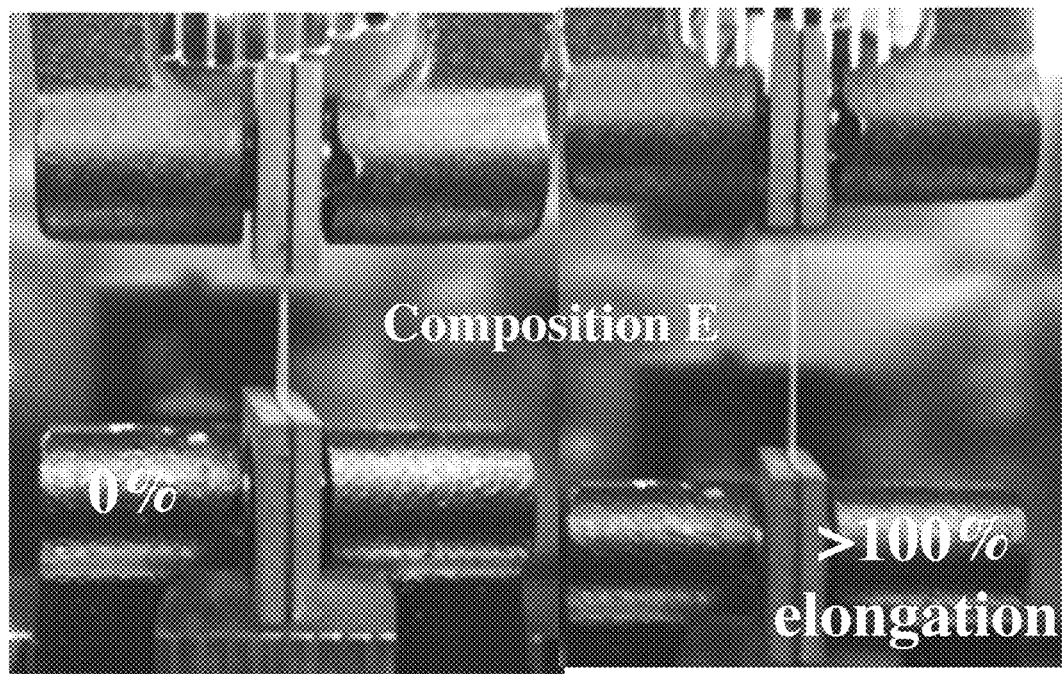
FIG. 19 illustrates a photographical representation of hydrolytic stability of sample blend E after various storage times and temperatures.

It can be seen that the blend containing the reactive oligomer, such as blends A, B, and E have a higher molecular weight after processing. In addition, the drop in molecular weight at 40° C. and 60° C. is much slower. It is found that even after 32 days at 40° C., the number average molecular weight of the blend is >20000 g/mol. On measuring the mechanical properties, it is found that the film exhibits >100% elongation at break after 32 days at 40° C. and 2 days at 60° C. The film processed in the absence of the reactive oligomer on the other hand loses its mechanical integrity because of drop in molecular weight below an industry desired molecular weight after 8 days at 40° C. and 2 days at 60° C. Photographic illustration of the film samples are provided in FIGS. 18-19. In particular, FIG. 18 illustrates photographs of film samples of J0 at 2 days storage at 60° C.; Blend B at 2 days storage at 60° C.; blend B at 16 days storage at 40° C. and blend B at 32 days storage at 40° C. FIG. 19 illustrates blend E at 90% RH, 60° C. at 2 days storage. Typically, an industry desired molecular weight is found to be about 20000 g/mol with respect to PS standards and is shown by a black line in FIGS. 14D, 15D, 16D, and 17D. In sum, the results indicate that the molecular weights of the blends is drastically improved on addition of the high functionality reactive oligomer. Likewise, the examples show that the molecular weight stability has a correlation to the hydrolytic stability which was surprisingly found to be drastically improved on addition of the high functionality reactive oligomer. In particular, blend B is found to retain excellent mechanical properties and molecular weight even after 32 days storage at 40° C. and 90% RH.

Item 1. A composition comprising the following components:
   a. 15 to 90 wt. % of a polyester or a polyester copolymer, based on a total weight of the composition; and
   b. 0.1 to 55 wt. % of an ether based, an ether-ester based, or an ester based plasticizer including one or more compounds selected from the group consisting of an epoxy based compound, a polycarbodiimide based compound, a phosphite containing compound, a hindered phenol, a bi-cyclic-imino ether, a bi-cyclic-imino ester, a hindered amine, 2,2'-bis(2-oxazoline) based molecules, isocyanates, di-isocyanates, and a combination thereof, based on a total weight of the composition.

Item 2. The composition of item 1, wherein the polyester or the polyester copolymer is aliphatic in nature.

Item 3. The composition of item 1, wherein the polyester or the polyester copolymer is a polylactic acid based composition.

Item 4. The composition of item 3, wherein the polylactic acid is a poly(L-lactic) acid.

Item 5. The composition of item 1, wherein the one or more compounds are covalently attached to the plasticizer.

Item 6. The composition of item 1, wherein the plasticizer is ether-ester based.

Item 7. The composition of item 6, wherein the plasticizer comprises bis[2-(2-butoxyethoxy)ethyl]hexane dioate.

Item 8. The composition of item 6, wherein the ether-ester based plasticizer includes tris nonyl phenyl phosphite.

Item 9. The composition of item 1, further comprising:
   a. 1 to 40 wt. % of a triblock copolymer.

Item 10. The composition of item 9, wherein component (c) comprises a polyethylene glycol triblock copolymer.

Item 11. The composition of item 9, wherein component (c) comprises a poly(ethylene glycol co-propylene glycol) triblock copolymer.

Item 12. The composition of item 9, wherein component (c) comprises a poly(oligoethylene glycol) acrylate triblock copolymer.

Item 13. The composition of item 1, wherein the composition comprises a glass transition temperature of less than about 65° C., less than about 64° C., less than about 63° C., less than about 62° C., less than about 61° C., less than about 60° C., less than about 59° C., less than about 58° C., less than about 57° C., less than about 56° C., less than about 55° C.

Item 14. The composition of item 1, wherein the composition comprises a glass transition temperature of less than about 55° C., less than about 54° C., less than about 53° C., less than about 52° C., less than about 51° C.

Item 15. The composition of item 1, wherein the composition comprises a glass transition temperature of less than about 50° C., less than about 49° C., less than about 48° C., less than about 47° C., less than about 46° C., less than about 45° C., less than about 44° C., less than about 43° C., less than about 44° C., less than about 43° C., less than about 42° C., less than about 41° C., less than about 40° C.

Item 16. The composition of item 1, wherein the composition comprises an acid value of less than about 10 mgKOH/g, less than about 9.5 mgKOH/g, less than about 9 mgKOH/g, less than about 8.5 mgKOH/g, less than about 8 mgKOH/g, less than about 7.5 mgKOH/g, less than about 7 mgKOH/g, less than about 6.5 mgKOH/g, less than about 6 mgKOH/g, less than about 5.5 mgKOH/g, less than about 5 mgKOH/g.

Item 17. The composition of item 1, wherein the composition comprises an acid value of less than about 4.5 mgKOH/g, less than about 4.4 mgKOH/g, less than about 4.3 mgKOH/g less than about 4.2 mgKOH/g, less than about 4.1 mgKOH/g.

Item 18. The composition of item 1, wherein the composition comprises an acid value of less than about 4.0 mgKOH/g.

Item 19. The composition of item 1, wherein the composition comprises a hydroxyl value of less than about 1000 mgKOH/g, less than about 975 mgKOH/g, less than about 950 mgKOH/g, less than about 925 mgKOH/g, less than about 900 mgKOH/g, less than about 875 mgKOH/g, less than about 850 mgKOH/g, less than about 825 mgKOH/g, less than about 800 mgKOH/g, less than about 775 mgKOH/g.

Item 20. The composition of item 1, wherein the composition comprises a hydroxyl value of less than about 750 mgKOH/g, less than about 725 mgKOH/g, less than about 700 mgKOH/g, less than about 675 mgKOH/g, less than about 650 mgKOH/g, less than about 625 mgKOH/g, less than about 600 mgKOH/g, less than about 575 mgKOH/g, less than about 550 mgKOH/g, less than about 525 mgKOH/g, less than about 500 mgKOH/g, less than about 475 mgKOH/g, less than about 450 mgKOH/g.

Item 21. A flexible tubing comprising the composition of item 1.

Item 22. A product comprising the composition of item 1, wherein the product is selected from the group consisting of foams, thermoform materials, films, woven and non-woven materials, fiberfills, packaging materials, molded articles and laminates.

Item 23. A composition comprising the following components:
   a. a polyester or a polyester copolymer;
   b. a plasticizer including one or more compounds selected from the group consisting of an epoxy based compound, a polycarbodiimide based compound, a phosphite containing compound, a hindered phenol, a bi-cyclic-imino ether, a bi-cyclic-imino ester, a hindered amine, 2,2'-bis(2-oxazoline) based molecules, isocyanates, di-isocyanates, and a combination thereof, wherein
      the composition comprises a glass transition temperature of less than about 60° C.; or
      the composition has an acid value of less than about 25 mgKOH/g; or combinations thereof.

Item 24. The composition of item 23, wherein the plasticizer is an ether based, an ether-ester based, or an ester based plasticizer.

Item 25. The composition of item 24, wherein the plasticizer is an ether-ester based plasticizer.

Item 26. The composition of item 24, wherein the plasticizer comprises bis[2-(2-butoxyethoxy)ethyl]hexane dioate.

Item 27. The composition of item 25, wherein the ether-ester based plasticizer includes tris nonyl phenyl phosphite.

Item 28. The composition of item 23, further comprising:
a. a triblock copolymer.

Item 29. The composition of item 28, wherein component (c) comprises a polyethylene glycol triblock copolymer.

Item 30. The composition of item 28, wherein component (c) comprises a poly(ethylene glycol co-propylene glycol) triblock copolymer.

Item 31. The composition of item 28, wherein component (c) comprises a poly(oligoethylene glycol) acrylate triblock copolymer.

Item 32. The composition of item 23, wherein the polyester or the polyester copolymer is aliphatic in nature.

Item 33. The composition of item 23, wherein the polyester or the polyester copolymer is a polylactic acid based composition.

Item 34. The composition of item 33, wherein the polylactic acid is a poly(L-lactic) acid.

Item 35. The composition of item 23, wherein the one or more compounds are covalently attached to the plasticizer.

Item 36. The composition of item 23, wherein the composition comprises a glass transition temperature of less than about 55° C., less than about 54° C., less than about 53° C., less than about 52° C., less than about 51° C.

Item 37. The composition of item 23, wherein the composition comprises a glass transition temperature of less than about 50° C., less than about 49° C., less than about 48° C., less than about 47° C., less than about 46° C., less than about 45° C., less than about 44° C., less than about 43° C., less than about 44° C., less than about 43° C., less than about 42° C., less than about 41° C., less than about 40° C.

Item 38. The composition of item 23, wherein the composition comprises an acid value of less than about 5 mgKOH/g, less than about 4.9 mgKOH/g, less than about 4.8 mgKOH/g, less than about 4.7 mgKOH/g, less than about 4.6 mgKOH/g.

Item 39. The composition of item 23, wherein the composition comprises an acid value of less than about 4.5 mgKOH/g, less than about 4.4. mgKOH/g, less than about 4.3 mgKOH/g, less than about 4.2 mgKOH/g, less than about 4.1 mgKOH/g.

Item 40. The composition of item 23, wherein the composition comprises an acid value of less than about 4.0 mgKOH/g.

Item 41. The composition of item 23, wherein the composition comprises a hydroxyl value of less than about 1000 mgKOH/g, less than about 975 mgKOH/g, less than about 950 mgKOH/g, less than about 925 mgKOH/g, less than about 900 mgKOH/g, less than about 875 mgKOH/g, less than about 850 mgKOH/g, less than about 825 mgKOH/g, less than about 800 mgKOH/g, less than about 775 mgKOH/g.

Item 42. The composition of item 23, wherein the composition comprises a hydroxyl value of less than about 750 mgKOH/g, less than about 725 mgKOH/g, less than about 700 mgKOH/g, less than about 675 mgKOH/g, less than about 650 mgKOH/g, less than about 625 mgKOH/g, less than about 600 mgKOH/g, less than about 575 mgKOH/g, less than about 550 mgKOH/g, less than about 525 mgKOH/g, less than about 500 mgKOH/g, less than about 475 mgKOH/g, less than about 450 mgKOH/g.

Item 43. A flexible tubing comprising the composition of item 23.

Item 44. A product comprising the composition of item 23, wherein the product is selected from the group consisting of foams, thermoform materials, films, woven and non-woven materials, fiberfills, packaging materials, molded articles and laminates.

Item 45. A composition comprising the following components:
a. 15 to 90 wt. % of a hydroxyl-acid based polyester or a hydroxyl-acid based polyester copolymer, based on a total weight of the composition; and
b. 0.1 to 55 wt. % of an ether based, an ether-ester based, or an ester based plasticizer including one or more compounds selected from the group consisting of an epoxy based compound, a polycarbodiimide based compound, a phosphite containing compound, a hindered phenol, a bi-cyclic-imino ether, a bi-cyclic-imino ester, a hindered amine, 2,2'-bis(2-oxazoline) based molecules, isocyanates, di-isocyanates, and a combination thereof, based on a total weight of the composition.

Item 46. A composition comprising a polylactic acid (PLA) polymer, wherein the PLA the PLA polymer has an average molecular weight of at least 20000.

Item 47. A composition comprising a polylactic acid (PLA) polymer, wherein the composition has an acid value of less than 3.0 mgKOH/g.

Item 48. A composition comprising a polylactic acid (PLA) polymer, wherein the composition is hydrolytically stable after 4 days at 40 degrees Celsius, wherein a composition is "hydrolytically stable", the composition is formed into a film and placed in an environmental chamber maintained at 90% relative humidity at specified temperature and for a specified time. If the sample has an average molecular weight of at least 20000 after storage, the composition is considered hydrolytically stable for the specified temperature and time.

Item 49. A composition comprising the following components:
a. a polyester or polyester copolymer;
b. a plasticizer including one or more compounds selected from the group consisting of an epoxy based compound, a polycarbodiimide based compound, a phosphite containing compound, a hindered phenol, a bi-cyclic-imino ether, a bi-cyclic-imino ester, a hindered amine, 2,2'-bis(2-oxazoline) based molecules, isocyanates, di-isocyanates, and a combination thereof, wherein the composition comprises an increase in viscosity, the viscosity being measured at a temperature above a melt state of the composition, and wherein the increase in viscosity is measured in comparison to a comparative composition, the comparative composition comprising an identical grade of polyester or polyester copolymer component (a), without a functionalized version of the plasticizer component (b).

Item 50. The composition of item 68, wherein the temperature is 5° C. above the melt state of the composition.

Item 51. The composition of item 68, wherein the temperature is 10° C. above the melt state of the composition.

Item 52. The composition of item 68, wherein the comparative composition substantially consists of an identical grade of component (a).

Item 53. The composition of item 68, wherein the viscosity is measured by a cone and plate, a parallel plate, or a capillary rheology methodology.

Item 54. The composition of item 68, further comprising:
a. a triblock copolymer.

Item 55. The composition of item 73, wherein component (c) comprises a polyethylene glycol triblock copolymer.

Item 56. The composition of item 73, wherein component (c) comprises a poly(ethylene glycol co-propylene glycol) triblock copolymer.

Item 57. The composition of item 73, wherein component (c) comprises a poly(oligoethylene glycol) acrylate triblock copolymer.

Item 58. The composition of item 68, wherein the plasticizer is an ether based, an ether-ester based, or an ester based plasticizer.

Item 59. The composition of item 77, wherein the plasticizer is an ether-ester based plasticizer.

Item 60. The composition of item 77, wherein the plasticizer comprises bis[2-(2-butoxyethoxy)ethyl]hexane dioate.

Item 61. The composition of item 78, wherein the ether-ester based plasticizer includes tris nonyl phenyl phosphite.

Item 62. The composition of item 68, wherein the polyester or the polyester copolymer is aliphatic in nature.

Item 63. The composition of item 68, wherein the polyester or the polyester copolymer is a polylactic acid based composition.

Item 64. The composition of item 82, wherein the polylactic acid is a poly(L-lactic) acid.

Item 65. The composition of item 68, wherein the one or more compounds are covalently attached to the plasticizer.

Item 66. The composition of item 68, wherein the composition comprises a glass transition temperature of less than about 65° C., less than about 64° C., less than about 63° C., less than about 62° C., less than about 61° C., less than about 60° C., less than about 59° C., less than about 58° C., less than about 57° C., less than about 56° C., less than about 55° C.

Item 67. The composition of item 68, wherein the composition comprises a glass transition temperature of less than about 55° C., less than about 54° C., less than about 53° C., less than about 52° C., less than about 51° C.

Item 68. The composition of item 68, wherein the composition comprises a glass transition temperature of less than about 50° C., less than about 49° C., less than about 48° C., less than about 47° C., less than about 46° C., less than about 45° C., less than about 44° C., less than about 43° C., less than about 44° C., less than about 43° C., less than about 42° C., less than about 41° C., less than about 40° C.

Item 69. The composition of item 68, wherein the composition comprises an acid value of less than about 10 mgKOH/g, less than about 9.5 mgKOH/g, less than about 9 mgKOH/g, less than about 8.5 mgKOH/g, less than about 8 mgKOH/g, less than about 7.5 mgKOH/g, less than about 7 mgKOH/g, less than about 6.5 mgKOH/g, less than about 6 mgKOH/g, less than about 5.5 mgKOH/g, less than about 5 mgKOH/g.

Item 70. The composition of item 68, wherein the composition comprises an acid value of less than about 4.5 mgKOH/g.

Item 71. The composition of item 68, wherein the composition comprises an acid value of less than about 4.0 mgKOH/g.

Item 72. The composition of item 68, wherein the composition comprises a hydroxyl value of less than about 1000 mgKOH/g, less than about 975 mgKOH/g, less than about 950 mgKOH/g, less than about 925 mgKOH/g, less than about 900 mgKOH/g, less than about 875 mgKOH/g, less than about 850 mgKOH/g, less than about 825 mgKOH/g, less than about 800 mgKOH/g, less than about 775 mgKOH/g.

Item 73. The composition of item 68, wherein the composition comprises a hydroxyl value of less than about 750 mgKOH/g, less than about 725 mgKOH/g, less than about 700 mgKOH/g, less than about 675 mgKOH/g, less than about 650 mgKOH/g, less than about 625 mgKOH/g, less than about 600 mgKOH/g, less than about 575 mgKOH/g, less than about 550 mgKOH/g, less than about 525 mgKOH/g, less than about 500 mgKOH/g, less than about 475 mgKOH/g, less than about 450 mgKOH/g.

Item 74. The composition of any one of the preceding claims, wherein the composition comprises a reactive plasticizer having a functionality of at least 1, at least 2, at least 3, at least 4, at least 5, at least 6, at least 7, at least 8, at least 9, at least 10, or even at least 11.

Item 75. The composition of any one of the preceding claims, wherein the composition comprises a reactive plasticizer having a functionality of no greater than 30, no greater than 25, no greater than 24, no greater than 23, no greater than 22, no greater than 21, or even no greater than 20.

Item 76. The composition of any one of the preceding claims, wherein the composition comprises a reactive plasticizer having a functionality in a range of 1 to 30, or even in a range of 5 to 25.

Item 77. The composition of any one of the preceding claims, wherein the composition comprises a reactive plasticizer having at least one or more functional groups reactive with —COOH, —OH, amide, and/or urea groups.

Item 78. The composition of any one of the preceding claims, wherein the composition comprises a reactive plasticizer having epoxy functionality.

Item 79. The composition of any one of the preceding claims, wherein the composition comprises a reactive plasticizer and a further plasticizer which is different than the reactive plasticizer.

Item 80. The composition of any one of the preceding claims, wherein the composition comprises a reactive plasticizer in an amount of at least about 0.1 wt. %, based on a total weight of the composition, such as at least about 0.2 wt. %, at least about 0.3 wt. %, at least about 0.4 wt. %, at least about 0.5 wt. %, at least about 0.6 wt. %, at least about 0.7 wt. %, at least about 0.8 wt. %, at least about 0.9 wt. %, at least about 1 wt. %, at least about 2 wt. %.

Item 81. The composition of any one of the preceding claims, wherein the composition comprises a reactive plasticizer in an amount of no greater than about 30 wt. %, no greater than about 25 wt. %, no greater than about 20 wt. %, no greater than about 15 wt. %, no greater than about 10 wt. %, no greater than about 8 wt. %, no greater than about 6 wt. %, no greater than about 5 wt. %, or even no greater than about 4 wt. %, based on the total weight of the composition.

Item 82. The composition of any one of the preceding claims, wherein the composition comprises a reactive plasticizer in an amount at least 1.5 wt. %.

Item 83. The composition of any one of the preceding claims, wherein the composition comprises a reactive plasticizer in an amount of no greater than 10 wt. %.

Item 84. The composition of any one of the preceding claims, wherein the composition comprises a hydroxyl-acid based polyester.

Item 85. The composition of any one of the preceding claims, wherein the composition comprises a polyester, which upon hydrolysis, has a carboxylic acid end-group and an opposing hydroxyl end-group.

Item 86. The composition of any one of the preceding claims, wherein the polyester excludes PET.

Item 87. The composition of any one of the preceding claims, wherein the polyester excludes polyesters which are made using di-acids and di-ols.

Item 88. The composition of any one of the preceding claims, wherein the composition comprises a modulus of at least 90 MPa, at least 95 MPa, at least 100 MPa, at least 105 MPA, at least 110 MPA, or even at least 120 MPa.

Item 89. A flexible tubing comprising the composition of item 68.

Item 90. A product comprising the composition of item 68, wherein the product is selected from the group consisting of foams, thermoform materials, films, woven and non-woven materials, fiberfills, packaging materials, molded articles and laminates.

In broad terms, the examples provided above in conjunction with the remainder of the present disclosure illustrates that the durability and the hydrolytic stability of polyester blends, such as poly(lactic acid) based blends can be significantly enhanced by increasing the molecular weight and consumption of the carboxylic acid end-groups. The Examples have demonstrated that the use of high functionality reactive oligomers can preserve or increase the polymer molecular weight and improve the durability and hydrolytic stability of a polyester based material, such as a PLA.

It will be appreciated that not all of the features, components and/or activities described above in the general description in relation to embodiments of the present disclosure or the examples are required, that a portion of a specific feature, component and/or activity may not be required, and that one or more further features, components and/or activities may be required, added or performed in addition to those described. Still further, the orders in which activities are listed are not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. As such, the above-disclosed subject matter is to be considered illustrative, and not restrictive.

Further, references to values stated in ranges include each and every value within that range. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure.

This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A composition comprising the following components:
   a. 15 to 90 wt. % of a chain-extended polyester or a chain-extended polyester copolymer, wherein the polyester or the polyester copolymer comprises PLLA and is aliphatic in nature, wherein the polyester or the polyester copolymer has an average molecular weight of at least 20000 g/mol;
   b. 1.5 to 25 wt. % of an ether based, an ether-ester based, or an ester based plasticizer comprising one or more compounds selected from the group consisting of an epoxy based compound, a polycarbodiimide based compound, a phosphite containing compound, a hindered phenol, a bi-cyclic-imino ether, a bi-cyclic-imino ester, a hindered amine, 2,2'-bis(2-oxazoline) based molecules, isocyanates, di-isocyanates, and a combination thereof, wherein the plasticizer comprises a reactive plasticizer having at least one or more functional groups reactive with —COOH or —OH groups; and
   c. 1 to 40 wt. % of a poly(D-lactide)-poly(ethylene glycol co-propylene glycol )-poly(D-lactide) (PDLA-PEPG-PDLA)triblock copolymer, wherein the triblock copolymer forms a stereocomplex with the chain-extended polyester or the chain-extended polyester copolymer, and
   d. 3 to 5 wt. % of a epoxy functional reactive oligomer with a functionality in the range of 1-11.

2. The composition of claim 1, wherein the composition comprises an acid value of less than about 25 mgKOH/g.

3. The composition of claim 1, wherein the composition is hydrolytically stable after 4 days at 40 degrees Celsius, wherein a composition is "hydrolytically stable", the composition is formed into a film and placed in an environmental chamber maintained at 90% relative humidity at specified temperature and for a specified time, and wherein if the sample has an average molecular weight of at least 20000 after storage, the composition is considered hydrolytically stable for the specified temperature and time.

4. The composition of claim 1, wherein the composition comprises an increase in viscosity, the viscosity being measured at 5 degrees Celsius above a melt state of the composition, and wherein the increase in viscosity is measured in comparison to a comparative composition, the comparative composition comprising an identical grade of polyester or polyester copolymer component (a), without a functionalized version of the plasticizer component (b).

5. The composition of claim 1, wherein the plasticizer comprises a reactive plasticizer, and wherein the reactive plasticizer has a functionality of from 5 to 30.

6. The composition of claim 1, wherein the plasticizer comprises a reactive plasticizer in an amount of from 1.5 wt. % to about 25 wt. %, based on the total weight of the composition.

7. The composition of claim 1, wherein the polyester or polyester copolymer comprises an hydroxyl-acid based polyester or polyester copolymer.

8. A flexible tubing comprising the composition of claim 1.

9. A product comprising the composition of claim 1, wherein the product is selected from the group consisting of foams, thermoform materials, films, woven and non-woven materials, fiberfills, packaging materials, molded articles and laminates.

10. The composition of claim 1, wherein the stereocomplex exhibits a stereocomplex crystallinity of at least 7%.

11. The composition of claim 1, wherein between about 37% and about 59% of the triblock copolymer is participating in the stereocomplex.

12. The composition of claim 1, wherein the epoxy functional reactive oligomer is completely soluble in chloroform.

13. The composition of claim 1, wherein the ether based, ether-ester based, or ester based plasticizer includes at least two compounds selected from the group consisting of an epoxy based compound, a polycarbodiimide based compound, a phosphite containing compound, a hindered phenol, a bi-cyclic-imino ether, a bi-cyclic-imino ester, a hindered amine, 2,2'-bis(2-oxazoline) based molecules, isocyanates, di-isocyanates, and a combination thereof.

14. The composition of claim 1, wherein the polyester or the polyester copolymer has an average molecular weight of less than 50000 g/mol.

15. The composition of claim 1, wherein the composition has a elongation at break of greater than 230%.

16. The composition of claim 1, wherein the composition has a Young's modulus of greater than 90 MPa.

17. A composition comprising the following components:
   a. 15 to 90 wt. % of a chain-extended polyester or a chain-extended polyester copolymer, wherein the polyester or polyester copolymer comprises an hydroxyl-acid based polyester or polyester copolymer, wherein the polyester or the polyester copolymer has an average molecular weight of at least 20000 g/mol;
   b. 1.5 to 25 wt. % of an ether based, an ether-ester based, or an ester based plasticizer comprising an epoxy based compound, wherein the plasticizer comprises a reactive plasticizer having at least one or more functional groups reactive with —COOH or —OH groups;
   c. 1 to 40 wt. % of a poly(D-lactide)-poly(ethylene glycol co-propylene glycol)-poly(D-lactide) (PDLA-PEPG-PDLA)triblock copolymer, wherein the triblock copolymer forms a stereocomplex with the chain-extended polyester or the chain-extended polyester copolymer, and
   d. 3 to 5 wt. % of a epoxy functional reactive oligomer with a functionality in the range of 1-11.

18. The composition of claim 17, wherein the composition is hydrolytically stable after 4 days at 40 degrees Celsius, wherein a composition is "hydrolytically stable", the composition is formed into a film and placed in an environmental chamber maintained at 90% relative humidity at specified temperature and for a specified time, and wherein if the sample has an average molecular weight of at least 20000 after storage, the composition is considered hydrolytically stable for the specified temperature and time.

19. A composition comprising the following components:
   a. 15 to 90 wt. % of a chain-extended polyester or a chain-extended polyester copolymer, wherein the polyester or the polyester copolymer is a polylactic acid based composition comprising PLLA, based on the total weight of the composition, wherein the polyester or the polyester copolymer has an average molecular weight of at least 20000 g/mol;
   b. 1.5 to 25 wt. % an ether based, an ether-ester based, or an ester based plasticizer comprising one or more compounds selected from the group consisting of an epoxy based compound, a polycarbodiimide based compound, a phosphite containing compound, a hindered phenol, a bi-cyclic-imino ether, a bi-cyclic-imino ester, a hindered amine, 2,2'-bis(2-oxazoline) based molecules, isocyanates, di-isocyanates, and a combination thereof, wherein the plasticizer comprises a reactive plasticizer having at least one or more functional groups reactive with —COOH or —OH groups, based on the total weight of the composition;
   c. 1 to 40 wt. % of a poly(D-lactide)-poly(ethylene glycol co-propylene glycol)-poly(D-lactide) (PDLA-PEPG-PDLA)triblock copolymer, wherein the triblock copolymer forms a stereocomplex with the chain-extended polyester or the chain-extended polyester copolymer; and
   d. 3 to 5 wt. % of a epoxy functional reactive oligomer with a functionality in the range of 1-11.

* * * * *